(12) United States Patent
Shin et al.

(10) Patent No.: US 12,504,607 B2
(45) Date of Patent: Dec. 23, 2025

(54) IMAGING LENS SYSTEM

(71) Applicant: SAMSUNG ELECTRO-MECHANICS CO., LTD., Suwon-si (KR)

(72) Inventors: Kil Soo Shin, Suwon-si (KR); Sot Eum Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 667 days.

(21) Appl. No.: 17/949,319

(22) Filed: Sep. 21, 2022

(65) Prior Publication Data

US 2023/0168468 A1 Jun. 1, 2023

(30) Foreign Application Priority Data

Nov. 29, 2021 (KR) .................. 10-2021-0167233
Mar. 28, 2022 (KR) .................. 10-2022-0038069

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
None
See application file for complete search history.

(56) References Cited

U.S. PATENT DOCUMENTS

| | | |
|---|---|---|
| 9,523,841 B1 | 12/2016 | Chen |
| 10,509,206 B2 | 12/2019 | Jhang et al. |
| 11,662,556 B2 | 5/2023 | Lv et al. |
| 2014/0092271 A1 | 4/2014 | Katou et al. |

(Continued)

FOREIGN PATENT DOCUMENTS

| | | |
|---|---|---|
| CN | 106443987 A | 2/2017 |
| CN | 107703608 A | 2/2018 |

(Continued)

OTHER PUBLICATIONS

Taiwanese Office Action issued on Dec. 26, 2022, in counterpart Taiwanese Patent Application No. 111136818 (7 pages in English, 8 pages in Chinese).

(Continued)

*Primary Examiner* — Phu Vu
(74) *Attorney, Agent, or Firm* — NSIP Law

(57) ABSTRACT

An imaging lens system is provided. The imaging lens system includes a first lens having refractive power; a second lens having positive refractive power and having a concave image-side surface; a third lens having refractive power; a fourth lens having positive refractive power and having a concave image-side surface; a fifth lens having a concave object-side surface; a sixth lens having a concave image-side surface; a seventh lens having a convex object-side surface; and an eighth lens having refractive power, wherein the first to eighth lenses are sequentially arranged from an object-side to an imaging side, and the imaging lens system satisfies the following conditional expression: 0.15<BFL/TTL, where BFL is a distance from an image-side surface of the eighth lens to an imaging plane, and TTL is a distance from an object-side surface of the first lens to the imaging plane.

17 Claims, 18 Drawing Sheets

(56) References Cited

U.S. PATENT DOCUMENTS

| | | |
|---|---|---|
| 2017/0192200 A1 | 7/2017 | Hsieh et al. |
| 2019/0033558 A1 | 1/2019 | Chang et al. |
| 2019/0056568 A1 | 2/2019 | Huang |
| 2019/0204558 A1* | 7/2019 | Jhang .................. G02B 9/64 |
| 2019/0310444 A1 | 10/2019 | Hashimoto |
| 2021/0018728 A1 | 1/2021 | Li et al. |
| 2021/0096329 A1 | 4/2021 | Lv et al. |
| 2021/0157092 A1 | 5/2021 | Chen et al. |
| 2021/0157097 A1 | 5/2021 | Hirano |
| 2021/0157103 A1 | 5/2021 | Son et al. |
| 2021/0302698 A1 | 9/2021 | Nitta et al. |
| 2025/0052981 A1* | 2/2025 | Seo .................. G02B 9/64 |

FOREIGN PATENT DOCUMENTS

| | | |
|---|---|---|
| CN | 108227146 A | 6/2018 |
| CN | 108681040 A | 10/2018 |
| CN | 110515187 A | 11/2019 |
| CN | 111352210 A | 6/2020 |
| CN | 112824951 A | 5/2021 |
| JP | 2021-156965 A | 10/2021 |
| KR | 10-2023-0046530 A | 4/2023 |
| TW | 201913165 A | 4/2019 |
| TW | 201930951 A | 8/2019 |
| TW | 202121000 A | 6/2021 |

OTHER PUBLICATIONS

Taiwanese Office Action issued on May 2, 2024, in counterpart Taiwanese Patent Application No. 112123190 (4 pages in English, 4 pages in Chinese).

Chinese Office Action Issued on Apr. 30, 2025, in Counterpart Chinese Patent Application No. 202211510636.1 (7 Pages in English, 12 Pages in Chinese).

* cited by examiner

I-I

I-I

IMAGING LENS SYSTEM

CROSS-REFERENCE TO RELATED APPLICATIONS

This application claims the benefit under 35 USC § 119(a) of Korean Patent Application No. 10-2021-0167233 filed on Nov. 29, 2021, and Korean Patent Application No. 10-2022-0038069 filed on Mar. 28, 2022, in the Korean Intellectual Property Office, the entire disclosures of which are incorporated herein by reference for all purposes.

BACKGROUND

1. Field

The following description relates to an imaging lens system.

2. Description of Related Art

A portable electronic device may include a camera module or device that captures images or videos. In an example, the camera module or device may be mounted in a mobile phone, a notebook computer, a game machine, as non-limited examples.

Resolution of the camera module and resolution of the imaging lens system may be proportional to a size of a sensor and a size of an imaging plane. In an example, in order to implement a camera module and an imaging lens system, having high resolution, a sensor and an imaging plane having a considerable size may be desirable. However, since a size (or a length) of the camera module and the imaging lens system may increase in proportion to the size of the sensor and the size of the imaging plane, it may be difficult to mount such a camera module and imaging lens system, having high resolution, in a thin electronic device such as a smartphone or similar device.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, an imaging lens system includes a first lens having a refractive power; a second lens having positive refractive power, and having a concave image-side surface; a third lens having a refractive power; a fourth lens having positive refractive power, and having a concave image-side surface; a fifth lens having a concave object-side surface; a sixth lens having a concave image-side surface; a seventh lens having a convex object-side surface; and an eighth lens having a refractive power, wherein the first to eighth lenses are sequentially arranged from an object-side to an imaging side, and the imaging lens system satisfies the following conditional expression: $0.15<BFL/TTL$, where BFL is a distance from an image-side surface of the eighth lens to an imaging plane, and TTL is a distance from an object-side surface of the first lens to the imaging plane.

The first lens may have a convex object-side surface.
The third lens may have a convex object-side surface.
The eighth lens may have a convex object-side surface.

The imaging lens system may satisfy the following conditional expression: $0<f1/f<8.0$, where f is a focal length of the imaging lens system, and f1 is a focal length of the first lens.

The imaging lens system may satisfy the following conditional expression: $0<f2/f<3.0$, where f is a focal length of the imaging lens system, and f2 is a focal length of the second lens.

The imaging lens system may satisfy the following conditional expression: $TTL/f<1.5$, where f is a focal length of the imaging lens system.

The imaging lens system may satisfy the following conditional expression: $BFL/f<0.4$, where f is a focal length of the imaging lens system.

The imaging lens system may satisfy the following conditional expression: $TTL/2ImgHT<0.8$, where 2ImgHT is a diagonal length of the imaging plane.

In a general aspect, as imaging system includes a first lens having positive refractive power; a second lens having positive refractive power; a third lens having a refractive power; a fourth lens having a refractive power; a fifth lens having a concave object-side surface; a sixth lens having a refractive power; a seventh lens having positive refractive power; and an eighth lens having a refractive power, wherein the first to eighth lenses are sequentially arranged from an object-side to an imaging side, and the imaging lens system satisfies the following conditional expression: $0.2<BFL/TTL<0.35$, where BFL is a distance from an image-side surface of the eighth lens to an imaging plane, and TTL is a distance from an object-side surface of the first lens to the imaging plane.

The third lens may have negative refractive power.
The eighth lens may have negative refractive power.
The imaging lens system may satisfy the following conditional expression: $0.02<BFL/f1<0.16$, where f1 is a focal length of the first lens.

The imaging lens system may satisfy the following conditional expression: $0.2<BFL/f2<0.4$, where f2 is a focal length of the second lens.

The imaging lens system may satisfy the following conditional expression: $-0.3<BFL/f3<-0.1$, where f3 is a focal length of the third lens.

The imaging lens system may satisfy the following conditional expression: $0.06<T1/ImgHT<0.10$, where T1 is a thickness of the first lens, and ImgHT is a height of the imaging plane.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
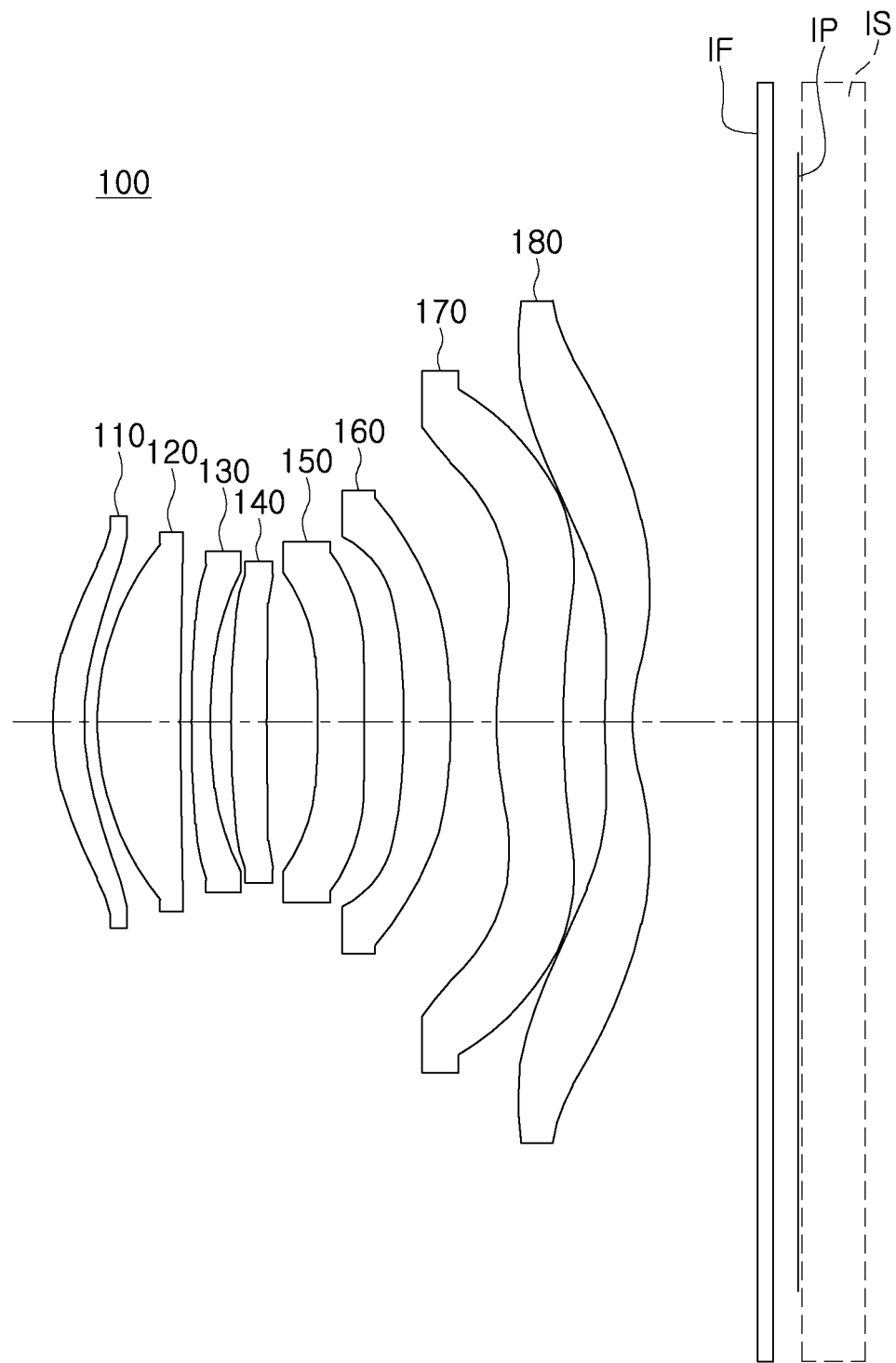
FIG. 1 illustrates an example imaging lens system, in accordance with a first embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In an example, the imaging lens system may be mounted in a portable electronic device.

In the one or more examples, a first lens refers to a lens most adjacent to an object (or a subject), and an eighth lens refers to a lens most adjacent to an imaging plane (or an image sensor). In the various examples, units of a radius of curvature, a thickness, a TTL (a distance from an object-side surface of the first lens to an imaging plane), a 2ImgHT (a diagonal length of the imaging plane), an ImgHT (a height of the imaging plane, or half of 2ImgHT), and a focal length of a lens are indicated in millimeters (mm).

A thickness of a lens, a distance between lenses, and a TTL refers to a distance of a lens that is calculated based on an optical axis of an imaging lens system. Additionally, in the descriptions of a shape of a lens, a configuration in which one surface is convex indicates that a paraxial region of the surface is convex, and a configuration in which one surface is concave indicates that a paraxial region of the surface is concave. Thus, even when it is described that one surface of a lens is convex, an edge of the lens may be concave. Similarly, even when it is described that one surface of a lens is concave, an edge of the lens may be convex.

An imaging lens system described in the various examples may be configured to be mounted on a portable electronic device. In an example, the imaging lens system may be mounted on, as non-limiting examples, a smartphone, a notebook computer, an augmented reality device, a virtual reality device (VR), a portable game machine, or the like. Ranges and examples of implementation of an imaging lens system described in the one or more examples are not limited to the above-described electronic device. In an example, the imaging lens system may provide a narrow mounting space, but may be applied to an electronic device that desires high-resolution imaging.

An example imaging lens system according to a first example may include a plurality of lenses. In an example, the imaging lens system may include a first lens, a second lens, a third lens, a fourth lens, a fifth lens, a sixth lens, a seventh lens, and an eighth lens, sequentially arranged from an object-side to an imaging side. The imaging lens system according to the first example may include a lens having predetermined refractive power. In an example, the imaging lens system according to the first example may include a second lens having positive refractive power and a fourth lens having positive refractive power.

The imaging lens system according to the first example may have a ratio (BFL/TTL) between the BFL (a distance from an image-side surface of the eighth lens (or a rearmost lens) to an imaging plane) and the TTL (a distance from an object-side surface of the first lens to the imaging plane) may have a unique numerical range. In an example, in the imaging lens system according to the first example, BFL/TTL may be greater than 0.15.

The imaging lens system according to the first example may include a lens in which one surface is concave. In an example, in the imaging lens system according to the first example, a fourth lens may have a concave image-side surface, a fifth lens may have a concave object-side surface, and a sixth lens may have a concave image-side surface. The imaging lens system according to the first example may include a lens in which one surface is convex. In an example, in the imaging lens system according to the first example, a seventh lens may have a convex object-side surface.

An imaging lens system according to a second example of the present disclosure may include a first lens, a second lens, a third lens, a fourth lens, a fifth lens, a sixth lens, a seventh lens, and an eighth lens, sequentially arranged from an object-side to an imaging side. In the imaging lens system according to the second example, the first lens and the second lens may have unique refractive power. In an example, both the first lens and the second lens may have positive refractive power.

The imaging lens system according to the second example may further include a lens having positive refractive power, in addition to the first lens and the second lens. In an example, in the imaging lens system according to the second example, the seventh lens may have positive refractive power. A lens having positive refractive power in the imaging lens system according to the second example is not limited to the seventh lens. The imaging lens system according to the second example may include a lens in which one surface is concave. In an example, in the imaging lens system according to the second example, the fifth lens may have a concave object-side surface.

The imaging lens system according to the second example may satisfy a predetermined conditional expression. In an example, in the imaging lens system according to the second example, a ratio (BFL/TTL) between a distance (BFL) from an image-side surface of the eighth lens to an imaging plane and a distance (TTL) from an object-side surface of the first lens to the imaging plane may be greater than 0.2 and less than 0.35.

An imaging lens system according to a third example may include a first lens, a second lens, a third lens, a fourth lens, a fifth lens, a sixth lens, a seventh lens, and an eighth lens, sequentially arranged from an object-side to an imaging side. In the imaging lens system according to the third example, the first lens and the second lens may have unique refractive power. In an example, both the first lens and the second lens may have positive refractive power.

The imaging lens system according to the third example may further include a lens having positive refractive power, in addition to the first lens and the second lens. In an example, in the imaging lens system according to the third example, at least one of the fourth to seventh lenses may have positive refractive power.

The imaging lens system according to the third example may have a BFL of a considerable size. In an example, in the imaging lens system according to the third example, the BFL may be longer than 2.0 mm and shorter than 3.0 mm.

An imaging lens system according to a fourth example may include a first lens, a second lens, a third lens, a fourth lens, a fifth lens, a sixth lens, a seventh lens, and an eighth lens, sequentially arranged from an object-side to an imaging side, and may satisfy one or more of the following conditional expressions:

$-20 < V1-V2 < 20$ $-10 < V1-V3 < 45$ $-10 < V1-V4 < 30$ $-10 < V1-V5 < 45$ $0 < f1/f < 8.0$ $0 < f2/f < 3.0$ $f3/f < 0$ $-10 < f4/f < 10$ $-15 < f5/f < 10$ $-10 < f6/f < 60$ $0 < f7/f$ $f8/f < 0$ $TTL/f < 1.5$ $0 < f1/f2 < 10$ $-2.0 < f2/f3 < 0$ $BFL/f < 0.4$ $D12/f<0.3$ $TLL/2\text{ImgHT}<0.8$ $(TTL-BFL)/2\text{ImgHT}<0.65$ In the above conditional expression, V1 is an Abbe number of the first lens, V2 is an Abbe number of the second lens, V3 is an Abbe number of the third lens, V4 is an Abbe number of the fourth lens, V5 is an Abbe number of the fifth lens. f is a focal length of the imaging lens system, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, f8 is a focal length of the eighth lens, D12 is a distance from an image-side surface of the first lens to an object-side surface of the second lens, and 2ImgHT is a diagonal length of the imaging plane.

The imaging lens system according to the fourth example may further satisfy the following conditional expressions:

$-2.0<f3/f<-1.0$ $3.0<f4/f<7.0$ $-4.0<f5/f<8.0$ $0.4<f7/f<2.0$ $-1.0<f8/f<0$ $0.9<TTL/f<1.2$ $0.19<BFL/f<0.40$ $0<D12/f<0.3$ $0.6<TTL/2\text{ImgHT}<0.7$ $0.4<(TTL-BFL)/2\text{ImgHT}<0.56$ $0.02<BFL/f1<0.16$ $0.2<BFL/f2<0.4$ $-0.3<BFL/f3<-0.1$ $0.06<T1/\text{ImgHT}<0.1$ $0.6<EPD/\text{ImgHT}<0.8$ $1.3<\text{SumT}/BFL<3.0$ In the above conditional expressions, T1 is a thickness of the first lens, ImgHT is a height of the imaging plane, EPD is an entrance pupil diameter, and SumT is a sum of thicknesses of the first to eighth lenses.

The imaging lens systems according to the first to fourth examples may include one or more lenses having the following characteristics, as necessary. In an example, the imaging lens system according to the first example may include one of the first to eighth lenses according to the following characteristics. In another example, the imaging lens system according to the second example may include two or more of the first to eighth lenses according to the following characteristics. An imaging lens system according to the above-described example may not necessarily include a lens according to the following characteristics.

Hereinafter, characteristics of the first to eighth lenses will be described.

The first lens may have refractive power. In an example, the first lens may have positive refractive power. The first lens may have a shape in which one surface is convex. In an example, the first lens may have a convex object-side surface. The first lens may include a spherical surface or an aspherical surface. In an example, both surfaces of the first lens may be aspherical. In an example, the first lens may be formed of a material having high light transmittance and excellent workability. In an example, the first lens may be formed of a plastic material or a glass material. The first lens may be configured to have a predetermined refractive index. In an example, a refractive index of the first lens may be less than 1.6. As a specific example, the refractive index of the first lens may be greater than 1.52 and less than 1.57. The first lens may have a predetermined Abbe number. In an example, the Abbe number of the first lens may be less than 60. As a specific example, the Abbe number of the first lens may be greater than 53 and less than 58.

The second lens has refractive power. In an example, the second lens may have positive refractive power. The second lens may have a shape in which one surface is concave. In an example, the second lens may have a concave image-side surface. The second lens may include a spherical surface or an aspherical surface. For example, both surfaces of the second lens may be aspherical. The second lens may be formed of a material having high light transmittance and excellent workability. For example, the second lens may be formed of a plastic material or a glass material. The second lens may be configured to have a predetermined refractive index. For example, a refractive index of the second lens may be less than 1.6. As a specific example, the refractive index of the second lens may be greater than 1.52 and less than 1.60. The second lens may have a predetermined Abbe number. For example, the Abbe number of the second lens may be 50 or more. As a specific example, the Abbe number of the second lens may be greater than 50 and less than 60.

The third lens may have refractive power. For example, the third lens may have negative refractive power. The third lens may have a shape in which one surface is convex. For example, the third lens may have a convex object-side surface. The third lens may include a spherical surface or an aspherical surface. In an example, both surfaces of the third lens may be aspherical. The third lens may be formed of a material having high light transmittance and excellent workability. In an example, the third lens may be formed of a plastic material or a glass material. The third lens may be configured to have a predetermined refractive index. For example, a refractive index of the third lens may be greater than 1.6. As a specific example, the refractive index of the third lens may be greater than 1.62 and less than 1.7. The third lens may have a predetermined Abbe number. In an example, the Abbe number of the third lens may be less than 30. As a specific example, the Abbe number of the third lens may be greater than 18 and less than 30.

The fourth lens may have refractive power. In an example, the fourth lens may have positive refractive power. The fourth lens may have a shape in which one side surface is concave. For example, the fourth lens may have a concave image-side surface. The fourth lens may include a spherical surface or an aspherical surface. For example, both surfaces of the fourth lens may be aspherical. The fourth lens may be formed of a material having high light transmittance and excellent workability. For example, the fourth lens may be formed of a plastic material or a glass material. The fourth lens may be configured to have a predetermined refractive index. For example, a refractive index of the fourth lens may be less than 1.6. As a specific example, the refractive index of the fourth lens may be greater than 1.5 and less than 1.6. The fourth lens may have a predetermined Abbe number. For example, the Abbe number of the fourth lens may be 30 or more. As a specific example, the Abbe number of the fourth lens may be greater than 30 and less than 60.

The fifth lens may have refractive power. For example, the fifth lens may have positive or negative refractive power. The fifth lens may have a shape in which one surface thereof is concave. For example, the fifth lens may have a concave object-side surface. The fifth lens may include a spherical surface or an aspherical surface. In an example, both surfaces of the fifth lens may be aspherical. The fifth lens may be formed of a material having high light transmittance and excellent workability. For example, the fifth lens may be formed of a plastic material or a glass material. The fifth lens may be configured to have a predetermined refractive index. For example, a refractive index of the fifth lens may be greater than 1.6. As a specific example, the refractive index of the fifth lens may be greater than 1.6 and less than 1.7. The fifth lens may have a predetermined Abbe number. For example, the Abbe number of the fifth lens may be less than 30. As a specific example, the Abbe number of the fifth lens may be greater than 18 and less than 30.

The sixth lens may have refractive power. For example, the sixth lens may have positive or negative refractive power. The sixth lens may have a shape in which one surface is concave. For example, the sixth lens may have a concave image-side surface or a concave object-side surface. The sixth lens may include a spherical surface or an aspherical surface. For example, both surfaces of the sixth lens may be aspherical. In an example, an inflection point may be formed on one or both surfaces of the sixth lens. For example, an inflection point may be formed on an object-side surface and an image-side surface of the sixth lens. The sixth lens may be formed of a material having high light transmittance and excellent workability. For example, the sixth lens may be formed of a plastic material or a glass material. The sixth lens may be configured to have a predetermined refractive index. For example, a refractive index of the sixth lens may be greater than 1.6. As a specific example, the refractive index of the sixth lens may be greater than 1.62 and less than 1.67. The sixth lens may have a predetermined Abbe number. For example, the Abbe number of the sixth lens may be less than 30. As a specific example, the Abbe number of the sixth lens may be greater than 20 and less than 30.

The seventh lens may have refractive power. For example, the seventh lens may have positive refractive power. The seventh lens may have a shape in which one surface is convex. For example, the seventh lens may have a convex object-side surface. The seventh lens may include a spherical surface or an aspherical surface. For example, both surfaces of the seventh lens may be aspherical. In an example, an inflection point may be formed on one or both surfaces of the seventh lens. For example, an inflection point may be formed on an object-side surface and an image-side surface of the seventh lens. Additionally, in a non-limited example, concave shapes and convex shapes may be formed together on one or both surfaces of the seventh lens. For example, an optical axis portion may be convex on an object-side surface of the seventh lens, and a peripheral portion of the optical axis may be concave on an object-side surface of the seventh lens. In an example, an optical axis portion may be concave or convex on an image-side surface of the seventh lens, and a peripheral portion of the optical axis may respectively be convex or concave on an image-side surface of the seventh lens. The seventh lens may be formed of a material having high light transmittance and excellent workability. For example, the seventh lens may be formed of a plastic material or a glass material. The seventh lens may be configured to have 13efractive13eed 13efractivee index. For example, a refractive index of the seventh lens may be less than 1.6. As a specific example, the refractive index of the seventh lens may be greater than 1.52 and less than 1.6. The seventh lens may have a predetermined Abbe number. For example, the Abbe number of the seventh lens may be less than 50. As a specific example, the Abbe number of the seventh lens may be greater than 30 and less than 50.

The eighth lens may have refractive power. For example, the eighth lens may have negative refractive power. The eighth lens may have a shape in which one surface of the eight lens is convex. For example, the eighth lens may have a convex object-side surface. The eighth lens may include a spherical surface or an aspherical surface. For example, both surfaces of the eighth lens may be aspherical. In an example, an inflection point may be formed on one or both surfaces of the eighth lens. For example, an inflection point may be formed on an object-side surface and an image-side surface of the eighth lens. Additionally, concave shapes and convex shapes may be formed together on one or both surfaces of the eighth lens. For example, an optical axis portion may be convex on an object-side surface of the eighth lens, and a peripheral portion of the optical axis may be concave on an object-side surface of the eighth lens. As another example, an optical axis portion may be concave on an object-side surface of the eighth lens, and a peripheral portion of the optical axis may be convex on an object-side surface of the eighth lens. As another example, an optical axis portion may be concave on an image-side surface of the eighth lens, and a peripheral portion of the optical axis may be convex on an image-side surface of the eighth lens. The eighth lens may be formed of a material having high light transmittance and excellent workability. For example, the eighth lens may be formed of a plastic material or a glass material. The eighth lens may be configured to have a predetermined refractive index. For example, a refractive index of the eighth lens may be less than 1.6. As a specific example, the refractive index of the eighth lens may be greater than 1.50 and less than 1.57. The eighth lens may have a predetermined Abbe number. For example, the Abbe number of the eighth lens may be less than 60. As a specific example, the Abbe number of the eighth lens may be greater than 52 and less than 60.

The first to eighth lenses may include a spherical surface or an aspherical surface, as described above. When the first to eighth lenses include an aspherical surface, the aspherical surface of the corresponding lens may be expressed by the following Equation 1 below:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \ldots \quad \text{Equation 1}$$

In Equation 1, c is the reciprocal of a radius of curvature of a corresponding lens, k is a conic constant, r is a distance from any point on the aspherical surface to an optical axis, A to J are aspherical surface constants, and Z (or SAG) is a height in an optical axis direction from a predetermined point on the aspherical surface to a vertex of the corresponding aspherical surface.

An imaging lens system, in accordance with one or more examples, may further include a stop and a filter. In an example, the imaging lens system may further include a stop disposed between the third lens and the fourth lens or between the fourth lens and the fifth lens. The stop may be configured to adjust an amount of light incident in an imaging plane direction. In one or more examples, the imaging lens system may further include a filter disposed between the eighth lens and the imaging plane. The filter may be configured to block light of a specific wavelength. In an example, the filter may be configured to block infrared light. However, this is only an example, and light of a wavelength to be blocked by the filter is not limited to the infrared light.

A camera module or device, in accordance with one or more embodiments, may include one or more of the imaging lens systems according to the above-described examples. In an example, the camera module may include an imaging lens system, in accordance with one or more examples. In an example, the camera module may include both an imaging lens system according to one example and an imaging lens system according to another example.

A camera module according to one example may be configured to be variable in size. Specifically, a distance CL from a forwardmost point of the camera module (e.g., an object-side surface of a first lens) to an image sensor may vary according to an operating state of the camera module. In a non-limiting example, CL in the operating state of the camera module may be greater than CL in a non-operational state of the camera module.

A camera module according to another example may include an imaging lens system that enables a change in size of the camera module. In an example, the camera module may include an imaging lens system including first to eighth lenses, sequentially arranged from an object-side surface. Additionally, the camera module may include an image sensor configured to convert an optical signal incident by the imaging lens system into an electrical signal.

The camera module may be configured to move the imaging lens system toward the image sensor. For example, the camera module may move the imaging lens system toward the image sensor to perform focus adjustment or focus magnification adjustment. The camera module may also be configured to move the imaging lens system toward the image sensor to reduce a size of the camera module. Movement displacement of the imaging lens system according to the latter may be greater than movement displacement of the imaging lens system according to the former. Specifically, the movement displacement of the imaging lens system according to the latter may be expressed by the following conditional expression:

$$0.7 < (BFLx - BFLm)/BFLx < 0.9$$

In the above conditional expression, BFLx is a distance from an image-side surface of a rearmost lens (e.g., an eighth lens in an imaging lens system consisting of eight (8) lenses) to an image sensor, in a state in which an imaging lens system is located furthest from the image sensor, and BFLm is a distance from an image-side surface of a rearmost lens to an image sensor, in a state in which the imaging lens system is located closest to the image sensor.

In the above description, a configuration in which an imaging lens system that makes up a camera module comprising eight (8) lenses has been illustrated. However, this is only an example, and the number of lenses making up the imaging lens system is not limited to eight (8). In an example, a camera module, in accordance with one or more embodiments, may include an imaging lens system comprising nine (9) lenses. However, this is only an example, and the camera module may include a number of lenses less than or greater than 9 lenses.

A camera module, in accordance with one or more embodiments, may satisfy the above-described conditional expression $0.7 < (BFLx - BFLm)/BFLx < 0.9$ to facilitate mounting in a thinned form, and may further satisfy other conditions for implementation of high resolution. For example, the camera module may include an image sensor of a considerable size to facilitate implementation of high resolution. Specifically, in a non-limiting example, an image height (a height of an imaging plane) that may be substantially formed in the image sensor may be 7.0 mm to 9.0 mm.

Hereinafter, a specific embodiment of the imaging lens system will be described with reference to the drawings.

First, an example imaging lens system according to a first example will be described with reference to FIG. 1.

An example imaging lens system 100 may include a first lens 110, a second lens 120, a third lens 130, a fourth lens 140, a fifth lens 150, a sixth lens 160, a seventh lens 170, and an eighth lens 180.

The first lens 110 may have positive refractive power, and may have a convex object-side surface and a concave image-side surface. The second lens 120 may have positive refractive power, and may have a convex object-side surface and a concave image-side surface. The third lens 130 may have negative refractive power, and may have a convex object-side surface and a concave image-side surface. The fourth lens 140 may have positive refractive power, and may have a convex object-side surface and a concave image-side surface. The fifth lens 150 may have negative refractive power, and may have a concave object-side surface and a convex image-side surface. The sixth lens 160 may have positive refractive power, and may have a concave object-side surface and a convex image-side surface. Additionally, an inflection point may be formed on an object-side surface and an image-side surface of the sixth lens 160. The seventh lens 170 may have positive refractive power, and may have a convex object-side surface and a concave image-side surface. Additionally, an inflection point may be formed on an object-side surface and an image-side surface of the seventh lens 170. The eighth lens 180 has negative refractive power, and may have a convex object-side surface and a concave image-side surface. Additionally, an inflection point may be formed on an object-side surface and an image-side surface of the eighth lens 180.

The example imaging lens system 100 may further include a filter IF and an imaging plane IP. The filter IF may be disposed between the eighth lens 180 and the imaging plane IP. The filter IF may be omitted as necessary. The imaging plane IP may be formed on one surface of an image sensor IS of a camera module or inside the image sensor IS. A position of the imaging plane IP may not be limited to one surface of the image sensor IS or an inside position of the image sensor IS.

Figure 2:
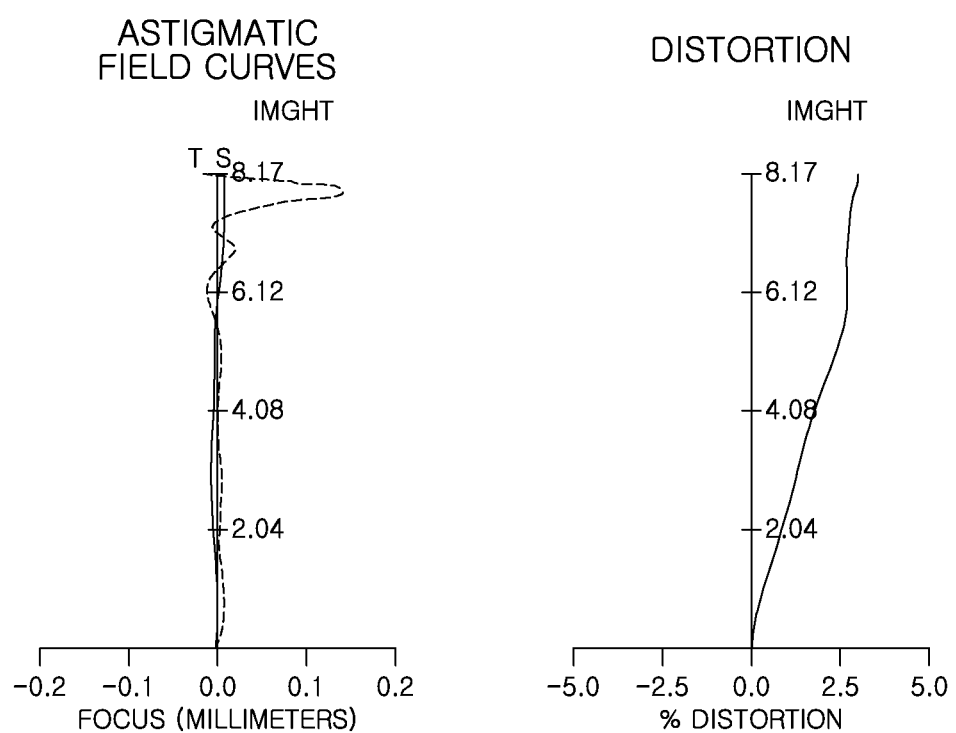
FIG. 2 illustrates an aberration curve of the example imaging lens system illustrated in FIG. 1.

Tables 1 and 2 below illustrate lens characteristics and aspheric values of the example imaging lens system according to the present example. FIG. 2 is an aberration curve of the imaging lens system according to the present example.

TABLE 1

| Surface No. | Component | Curvature Radius | Thickness/ Distance | Refractive Index | Abbe No. |
|---|---|---|---|---|---|
| S1 | 1st Lens | 3.7276 | 0.4951 | 1.546 | 56.0 |
| S2 | | 3.9638 | 0.1873 | | |
| S3 | 2nd Lens | 3.7251 | 1.2310 | 1.546 | 56.0 |
| S4 | | 21.5319 | 0.1710 | | |
| S5 | 3rd Lens | 15.5401 | 0.2800 | 1.667 | 20.4 |
| S6 | | 6.5463 | 0.3193 | | |
| S7 | 4th Lens | 13.3616 | 0.5352 | 1.546 | 56.0 |
| S8 | | 31.9754 | 0.7601 | | |
| S9 | 5th Lens | −16.3802 | 0.7091 | 1.677 | 19.2 |
| S10 | | −111.2140 | 0.5833 | | |
| S11 | 6th Lens | −33.1684 | 0.6897 | 1.644 | 23.5 |
| S12 | | −24.7140 | 0.6957 | | |
| S13 | 7th Lens | 5.2876 | 1.0095 | 1.570 | 37.4 |
| S14 | | 21.5263 | 0.6062 | | |
| S15 | 8th Lens | 5.1319 | 0.4187 | 1.537 | 55.7 |
| S16 | | 2.3122 | 1.8836 | | |
| S17 | Filter | Infinity | 0.2300 | 1.518 | 64.2 |
| S18 | | Infinity | 0.3670 | | |
| S19 | Imaging Plane | Infinity | 0.0030 | | |

TABLE 2

| Surface No. | S1 | S2 | S3 | S4 | S5 | S6 | S7 | S8 |
|---|---|---|---|---|---|---|---|---|
| K | −3.26E+00 | −8.10E+00 | −3.89E+00 | −5.56E+01 | 1.70E+01 | 6.02E+00 | −1.93E+01 | 6.10E+01 |
| A | 4.67E−03 | 5.36E−03 | 1.28E−03 | −5.97E−03 | −6.01E−03 | −3.66E−03 | −1.81E−03 | −3.64E−03 |
| B | −8.16E−03 | −3.32E−03 | −1.03E−03 | 9.00E−03 | 2.20E−03 | 5.55E−03 | 8.99E−04 | 2.07E−05 |
| C | 5.57E−04 | 1.97E−03 | 1.62E−03 | −3.44E−04 | −2.11E−04 | 7.88E−04 | −4.16E−03 | −8.25E−05 |
| D | −5.05E−04 | −1.25E−03 | −1.82E−03 | 7.93E−04 | 1.52E−04 | −1.42E−03 | 7.88E−03 | −2.60E−04 |
| E | 3.32E−04 | 7.11E−04 | 1.54E−03 | −8.82E−04 | −9.51E−05 | 1.54E−03 | −9.49E−03 | 7.01E−04 |
| F | −1.62E−04 | −3.26E−04 | −9.28E−04 | 5.90E−04 | −9.96E−05 | −1.26E−04 | 7.93E−03 | −6.76E−04 |
| G | 5.76E−05 | 1.15E−04 | 4.00E−04 | −2.65E−04 | 1.60E−04 | 7.50E−04 | −4.72E−03 | 3.67E−04 |
| H | −1.49E−05 | −3.05E−05 | −1.24E−04 | 8.38E−05 | −9.93E−05 | −3.14E−04 | 2.03E−03 | −1.16E−04 |
| J | 2.80E−06 | 5.99E−06 | 2.77E−05 | −1.88E−05 | 3.63E−05 | 9.16E−05 | −6.34E−04 | 1.74E−05 |

| Surface No. | S9 | S10 | S11 | S12 | S13 | S14 | S15 | S16 |
|---|---|---|---|---|---|---|---|---|
| K | −2.46E+01 | −9.60E+01 | 1.54E+01 | −8.04E+01 | −1.12E+01 | −8.97E+01 | −4.03E+01 | −7.81E+00 |
| A | −1.37E−02 | −1.13E−02 | −1.33E−02 | −2.21E−02 | 5.26E−03 | 2.21E−02 | −3.83E−02 | −3.04E−02 |
| B | 1.87E−04 | −1.53E−03 | 5.75E−04 | 8.76E−04 | −7.82E−03 | −9.36E−03 | 9.04E−03 | 7.05E−03 |
| C | −2.83E−04 | 4.14E−03 | 2.03E−03 | 2.18E−03 | 2.59E−03 | 1.54E−03 | −2.11E−03 | −1.42E−03 |
| D | −7.98E−04 | −5.67E−03 | −1.75E−03 | −1.20E−03 | −5.90E−04 | 1.16E−05 | 4.34E−04 | 2.37E−04 |
| E | 1.86E−04 | 4.93E−03 | 7.91E−04 | 3.44E−04 | 1.01E−04 | −6.68E−05 | −6.49E−05 | −3.04E−05 |
| F | −2.07E−03 | −3.00E−03 | −2.52E−04 | −5.68E−05 | −1.34E−05 | 1.70E−05 | 6.77E−06 | 2.91E−06 |
| G | 1.48E−03 | 1.33E−03 | 6.19E−05 | 2.85E−06 | 1.36E−06 | −2.48E−06 | −4.97E−07 | −2.05E−07 |
| H | −7.24E−04 | −4.30E−04 | −1.24E−05 | 9.81E−07 | −9.90E−08 | 2.41E−07 | 2.61E−08 | 1.05E−08 |
| J | 2.48E−04 | 1.02E−04 | 2.16E−06 | −2.60E−07 | 4.76E−09 | −1.64E−08 | −9.83E−10 | −3.88E−10 |

Figure 3:
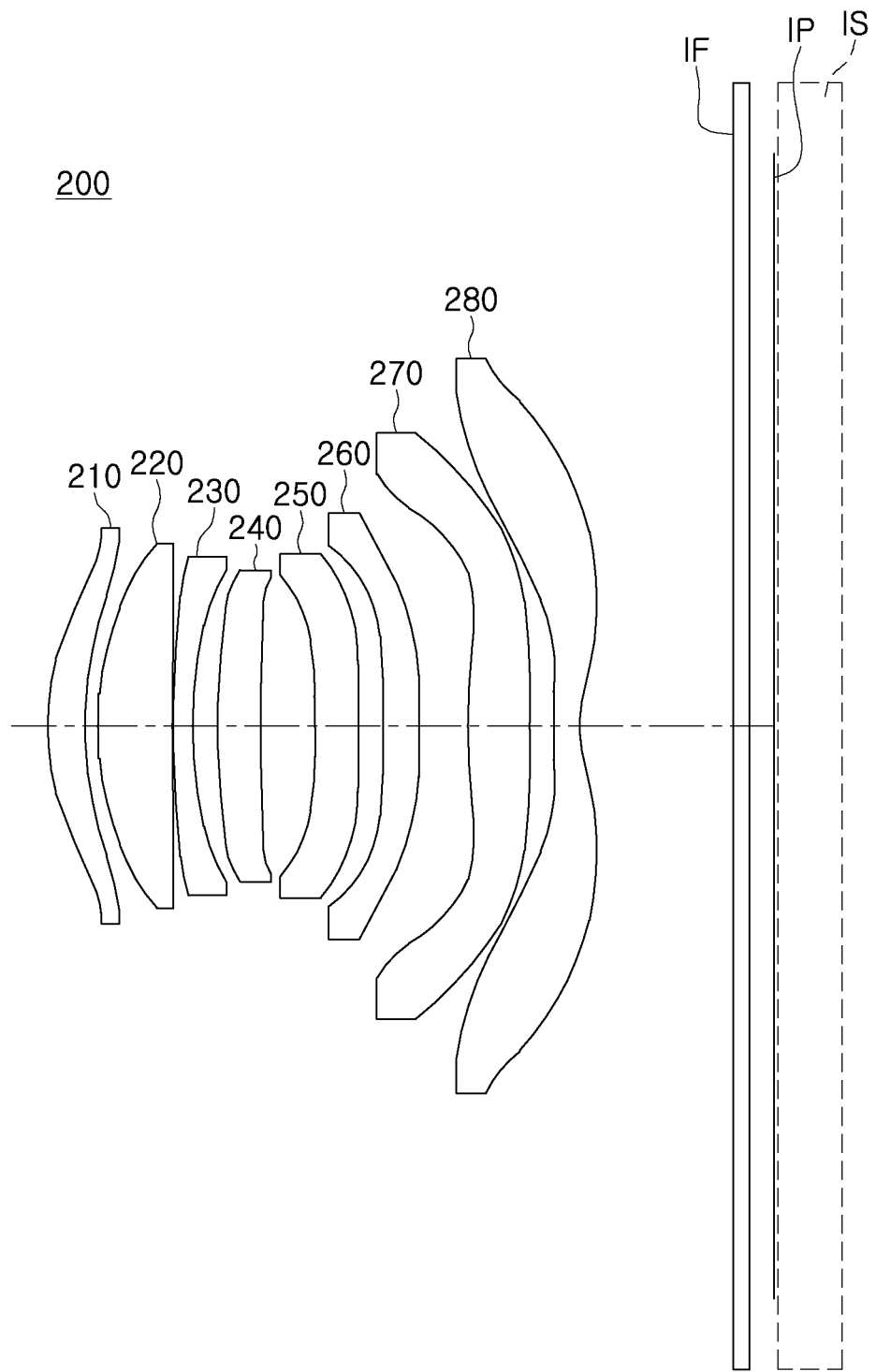
FIG. 3 illustrates a configuration diagram of an example imaging lens system, in accordance with a second embodiment.

An example imaging lens system according to a second example will be described with reference to FIG. 3.

An example imaging lens system 200 may include a first lens 210, a second lens 220, a third lens 230, a fourth lens 240, a fifth lens 250, a sixth lens 260, a seventh lens 270, and an eighth lens 280.

The first lens 210 may have positive refractive power, and may have a convex object-side surface and a concave image-side surface. The second lens 220 may have positive refractive power, and may have a convex object-side surface and a concave image-side surface. The third lens 230 may have negative refractive power, and may have a convex object-side surface and a concave image-side surface. The fourth lens 240 may have positive refractive power, and may have a convex object-side surface and a concave image-side surface. The fifth lens 250 may have negative refractive power, and may have a concave object-side surface and a concave image-side surface. The sixth lens 260 may have positive refractive power, and may have a convex object-side surface and a concave image-side surface. In addition, an inflection point may be formed on an object-side surface and an image-side surface of the sixth lens 260. The seventh lens 270 may have positive refractive power, and may have a convex object-side surface and a convex image-side surface. In addition, an inflection point may be formed on an object-side surface and an image-side surface of the seventh lens 270. The eighth lens 280 may have negative refractive power, and may have a convex object-side surface and a concave image-side surface. In addition, an inflection point may be formed on an object-side surface and an image-side surface of the eighth lens 280.

The example imaging lens system 200 may further include a filter IF and an imaging plane IP. The filter IF may be disposed between the eighth lens 280 and the imaging plane IP. The filter IF may be omitted as necessary. The imaging plane IP may be formed on one surface of an image sensor IS of a camera module or inside the image sensor IS.

Figure 4:
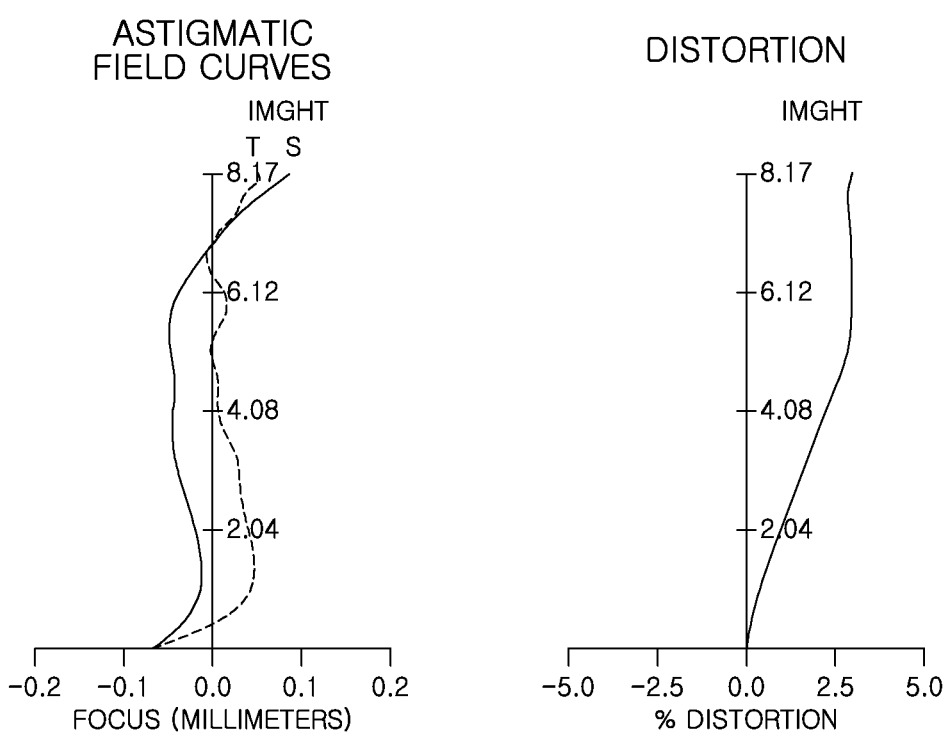
FIG. 4 illustrates an aberration curve of the example imaging lens system illustrated in FIG. 3.

Tables 3 and 4 below illustrate lens characteristics and aspheric values of the example imaging lens system according to the present example. FIG. 4 is an aberration curve of the imaging lens system according to the present example.

TABLE 3

| Surface No. | Component | Curvature Radius | Thickness/ Distance | Refractive Index | Abbe No. |
|---|---|---|---|---|---|
| S1 | 1st Lens | 3.6764 | 0.5582 | 1.546 | 56.0 |
| S2 | | 4.9266 | 0.1825 | | |
| S3 | 2nd Lens | 4.5719 | 1.1026 | 1.546 | 56.0 |
| S4 | | 29.3737 | 0.0322 | | |
| S5 | 3rd Lens | 19.2492 | 0.2800 | 1.656 | 21.5 |
| S6 | | 6.4991 | 0.3665 | | |
| S7 | 4th Lens | 9.4151 | 0.6246 | 1.546 | 56.0 |
| S8 | | 17.9100 | 0.8221 | | |
| S9 | 5th Lens | −20.5060 | 0.6336 | 1.677 | 19.2 |
| S10 | | 280.7670 | 0.3832 | | |
| S11 | 6th Lens | 128.1270 | 0.5286 | 1.640 | 24.0 |
| S12 | | 346.1680 | 0.7149 | | |
| S13 | 7th Lens | 7.9891 | 0.9419 | 1.570 | 37.4 |
| S14 | | −8.8338 | 0.3268 | | |
| S15 | 8th Lens | 4.9277 | 0.4106 | 1.537 | 55.7 |
| S16 | | 1.8499 | 2.2768 | | |

TABLE 3-continued

| Surface No. | Component | Curvature Radius | Thickness/ Distance | Refractive Index | Abbe No. |
|---|---|---|---|---|---|
| S17 | Filter | Infinity | 0.2100 | 1.518 | 64.2 |
| S18 | | Infinity | 0.3734 | | |
| S19 | Imaging Plane | Infinity | 0.0166 | | |

TABLE 4

| Surface No. | S1 | S2 | S3 | S4 | S5 | S6 | S7 | S8 |
|---|---|---|---|---|---|---|---|---|
| K | −3.55E+00 | −1.01E+01 | −4.01E+00 | −9.60E+01 | 2.01E+01 | 5.98E+00 | −1.78E+01 | 2.02E+01 |
| A | 6.06E−03 | 3.43E−03 | 7.27E−05 | −3.70E−03 | −3.29E−03 | −5.70E−03 | −4.03E−03 | −4.23E−03 |
| B | −4.02E−04 | −1.60E−03 | 4.29E−04 | −2.07E−03 | −9.39E−04 | −1.00E−03 | 1.18E−03 | −2.80E−03 |
| C | −7.37E−04 | −7.51E−04 | −1.78E−03 | −9.95E−04 | −4.10E−04 | 5.49E−03 | −3.24E−03 | 8.57E−03 |
| D | 6.67E−04 | 1.56E−03 | 2.81E−03 | 4.24E−03 | 2.32E−03 | −1.09E−02 | 5.91E−03 | −1.64E−02 |
| E | −3.58E−04 | −1.24E−03 | −2.47E−03 | −4.26E−03 | −1.91E−03 | 1.35E−02 | −6.91E−03 | 2.12E−02 |
| F | 1.18E−04 | 6.30E−04 | 1.47E−03 | 2.56E−03 | 7.35E−04 | −1.13E−02 | 5.63E−03 | −1.90E−02 |
| G | −2.27E−05 | −2.18E−04 | −6.07E−04 | −1.06E−03 | −9.15E−05 | 6.56E−03 | −3.25E−03 | 1.21E−02 |
| H | 1.65E−06 | 5.26E−05 | 1.79E−04 | 3.12E−04 | −4.58E−05 | −2.70E−03 | 1.35E−03 | −5.53E−03 |
| J | 3.38E−07 | −8.98E−06 | −3.81E−05 | −6.69E−05 | 2.74E−05 | 7.92E−04 | −4.02E−04 | 1.82E−03 |
| Surface No. | S9 | S10 | S11 | S12 | S13 | S14 | S15 | S16 |
| K | −1.59E+01 | −9.60E+01 | 9.60E+01 | 4.94E+01 | −8.67E+00 | −7.82E+01 | −7.19E+01 | −8.25E+00 |
| A | −1.23E−02 | −1.22E−02 | −2.58E−02 | −3.16E−02 | 5.79E−03 | 1.72E−02 | −7.17E−02 | −4.68E−02 |
| B | 1.20E−03 | −2.46E−03 | 3.08E−03 | 1.11E−03 | −1.13E−02 | −4.85E−03 | 2.59E−02 | 1.63E−02 |
| C | −4.58E−03 | 7.41E−03 | 3.09E−03 | 4.06E−03 | 4.98E−03 | −1.49E−03 | −7.78E−03 | −4.44E−03 |
| D | 6.21E−03 | −9.66E−03 | −1.50E−03 | −1.93E−03 | −1.81E−03 | 1.42E−03 | 1.84E−03 | 9.27E−04 |
| E | −5.10E−03 | 7.93E−03 | −9.22E−04 | 2.97E−05 | 5.58E−04 | −5.24E−04 | −3.15E−04 | −1.46E−04 |
| F | 2.18E−03 | −4.70E−03 | 1.31E−03 | 3.85E−04 | −1.44E−04 | 1.23E−04 | 3.81E−05 | 1.72E−05 |
| G | −2.77E−05 | 2.08E−03 | −7.25E−04 | −2.19E−04 | 3.01E−05 | −2.02E−05 | −3.30E−06 | −1.51E−06 |
| H | −5.37E−04 | −6.87E−04 | 2.47E−04 | 6.79E−05 | −4.92E−06 | 2.39E−06 | 2.07E−07 | 9.90E−08 |
| J | 3.36E−04 | 1.69E−04 | −5.65E−05 | −1.36E−05 | 6.19E−07 | −2.06E−07 | −9.44E−09 | −4.79E−09 |

Figure 5:
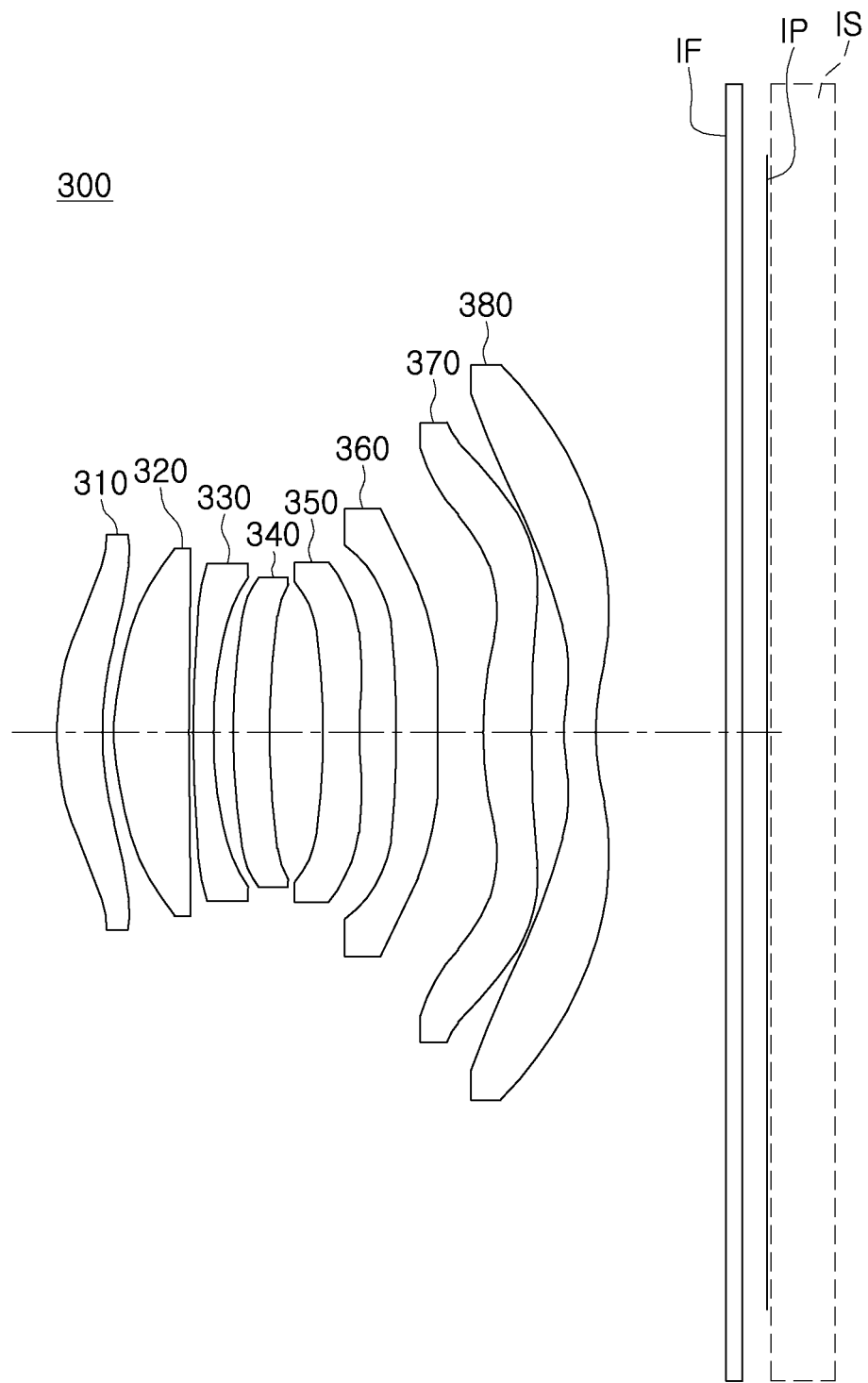
FIG. 5 illustrates a configuration diagram of an example imaging lens system, in accordance with a third embodiment.

An example imaging lens system according to a third example will be described with reference to FIG. 5.

An example imaging lens system 300 may include a first lens 310, a second lens 320, a third lens 330, a fourth lens 340, a fifth lens 350, a sixth lens 360, a seventh lens 370, and an eighth lens 380.

The first lens 310 may have positive refractive power, and may have a convex object-side surface and a concave image-side surface. The second lens 320 may have positive refractive power, and may have a convex object-side surface and a concave image-side surface. The third lens 330 may have negative refractive power, and may have a convex object-side surface and a concave image-side surface. The fourth lens 340 may have positive refractive power, and may have a convex object-side surface and a concave image-side surface. The fifth lens 350 has negative refractive power, and may have a concave object-side surface and a concave image-side surface. The sixth lens 360 may have positive refractive power, and may have a convex object-side surface and a concave image-side surface. In addition, an inflection point may be formed on an object-side surface and an image-side surface of the sixth lens 360. The seventh lens 370 may have positive refractive power, and may have a convex object-side surface and a concave image-side surface. Additionally, an inflection point may be formed on an object-side surface and an image-side surface of the seventh lens 370. The eighth lens 380 may have negative refractive power, and may have a convex object-side surface and a concave image-side surface. Additionally, an inflection point may be formed on an object-side surface and an image-side surface of the eighth lens 380.

The example imaging lens system 300 may further include a filter IF and an imaging plane IP. The filter IF may be disposed between the eighth lens 380 and the imaging plane IP. The filter IF may be omitted as necessary. The imaging plane IP may be formed on one surface of an image sensor IS of a camera module or inside the image sensor IS.

Figure 6:
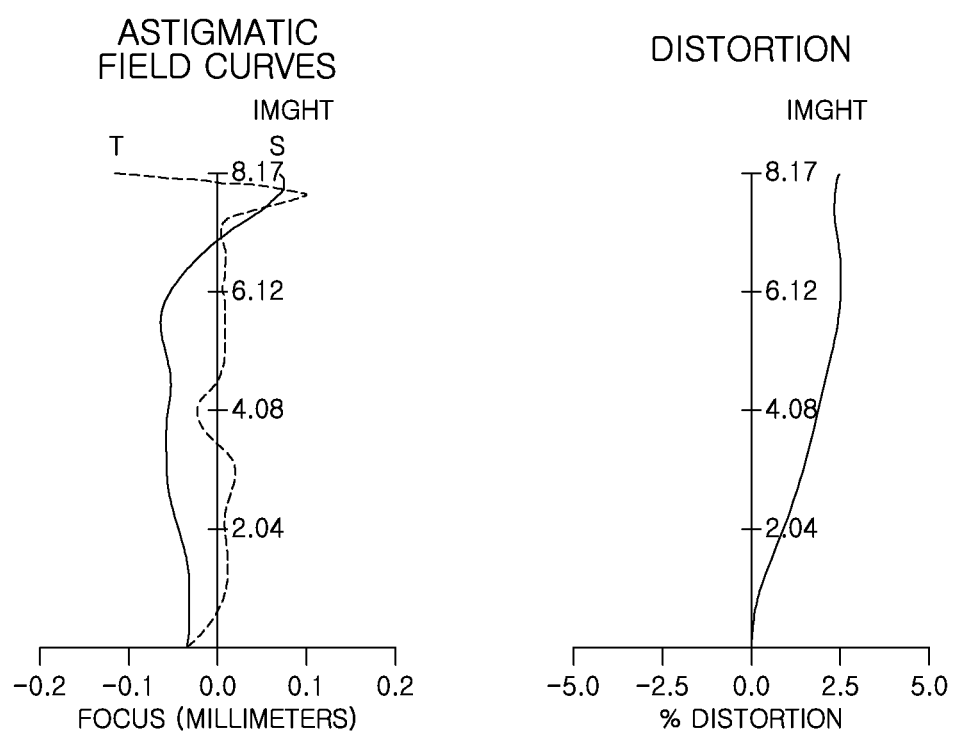
FIG. 6 illustrates an aberration curve of the example imaging lens system illustrated in FIG. 5.

Tables 5 and 6 below illustrate lens characteristics and aspheric values of the example imaging lens system according to the present example. FIG. 6 is an aberration curve of the imaging lens system according to the present example.

TABLE 5

| Surface No. | Component | Curvature Radius | Thickness/ Distance | Refractive Index | Abbe No. |
|---|---|---|---|---|---|
| S1 | 1st Lens | 3.6698 | 0.6944 | 1.546 | 56.0 |
| S2 | | 4.4874 | 0.1590 | | |
| S3 | 2nd Lens | 4.1711 | 1.0969 | 1.546 | 56.0 |
| S4 | | 37.9813 | 0.0811 | | |
| S5 | 3rd Lens | 22.1942 | 0.2800 | 1.667 | 20.4 |
| S6 | | 6.4030 | 0.3047 | | |
| S7 | 4th Lens | 8.9366 | 0.5279 | 1.570 | 37.4 |
| S8 | | 11.8072 | 0.7806 | | |
| S9 | 5th Lens | −69.2462 | 0.5774 | 1.667 | 20.4 |
| S10 | | 37.8465 | 0.4985 | | |
| S11 | 6th Lens | 24.7188 | 0.6136 | 1.644 | 23.5 |
| S12 | | 31.4854 | 0.6902 | | |
| S13 | 7th Lens | 5.4781 | 0.6907 | 1.570 | 37.4 |
| S14 | | 117.9790 | 0.4969 | | |
| S15 | 8th Lens | 4.4026 | 0.4250 | 1.537 | 55.7 |
| S16 | | 2.0588 | 2.1683 | | |
| S17 | Filter | Infinity | 0.2100 | 1.518 | 64.2 |
| S18 | | Infinity | 0.3813 | | |
| S19 | Imaging Plane | Infinity | 0.0087 | | |

TABLE 6

| Surface No. | S1 | S2 | S3 | S4 | S5 | S6 | S7 | S8 |
|---|---|---|---|---|---|---|---|---|
| K | −4.08E+00 | −1.37E+01 | −4.57E+00 | 2.34E+01 | 3.24E+01 | 5.98E+00 | −1.12E+01 | 2.05E+01 |
| A | 7.33E−03 | 9.03E−03 | 7.33E−04 | −2.31E−03 | −1.63E−04 | −3.18E−03 | −4.66E−03 | −5.39E−03 |
| B | −1.26E−03 | −6.21E−03 | −6.94E−04 | −5.22E−03 | −5.92E−03 | −4.08E−03 | 2.83E−03 | −1.53E−05 |
| C | 1.89E−04 | 1.62E−03 | −1.10E−03 | 5.34E−03 | 6.90E−03 | 7.51E−03 | −8.83E−03 | 2.74E−03 |
| D | −2.17E−04 | 1.29E−04 | 2.01E−03 | −2.88E−03 | −3.83E−03 | −9.42E−03 | 1.72E−02 | −7.17E−03 |
| E | 2.13E−04 | −4.59E−04 | −1.76E−03 | 8.70E−04 | 9.89E−04 | 9.07E−03 | −2.12E−02 | 1.09E−02 |
| F | −1.38E−04 | 3.02E−04 | 1.05E−03 | −8.68E−06 | 2.01E−04 | −6.62E−03 | 1.79E−02 | −1.06E−02 |
| G | 5.83E−05 | −1.17E−04 | −4.36E−04 | −1.36E−04 | −3.15E−04 | 3.60E−03 | −1.06E−02 | 7.05E−03 |
| H | −1.68E−05 | 3.05E−05 | 1.30E−04 | 7.39E−05 | 1.53E−04 | −1.44E−03 | 4.52E−03 | −3.29E−03 |
| J | 3.38E−06 | −5.47E−06 | −2.78E−05 | −2.22E−05 | −4.52E−05 | 4.23E−04 | −1.39E−03 | 1.09E−03 |

| Surface No. | S9 | S10 | S11 | S12 | S13 | S14 | S15 | S16 |
|---|---|---|---|---|---|---|---|---|
| K | 9.64E+01 | 7.08E+01 | 7.57E+01 | −9.65E+01 | −4.88E+00 | 9.37E+01 | −3.00E+01 | −7.38E+00 |
| A | −1.41E−02 | −1.78E−02 | −2.94E−02 | −3.54E−02 | 4.71E−03 | 2.16E−02 | −7.13E−02 | −4.87E−02 |
| B | 3.27E−03 | 1.10E−03 | 6.10E−03 | 5.85E−03 | −7.88E−03 | −2.19E−03 | 3.06E−02 | 1.86E−02 |
| C | −5.17E−03 | 6.99E−03 | 1.50E−03 | 5.88E−04 | 2.00E−03 | −4.58E−03 | −1.10E−02 | −5.92E−03 |
| D | 6.73E−03 | −1.39E−02 | −2.63E−03 | −5.17E−03 | −4.47E−04 | 2.72E−03 | 2.93E−03 | 1.43E−03 |
| E | −7.14E−03 | 1.48E−02 | 1.39E−03 | −3.94E−05 | 1.55E−04 | −8.36E−04 | −5.35E−04 | −2.51E−04 |
| F | 5.52E−03 | −1.06E−02 | −3.96E−04 | 1.32E−04 | −5.39E−05 | 1.68E−04 | 6.76E−05 | 3.22E−05 |
| G | −3.04E−03 | 5.39E−03 | 3.46E−05 | −6.59E−05 | 1.25E−05 | −2.35E−05 | −6.00E−06 | −3.01E−06 |
| H | 1.19E−03 | −1.98E−03 | 1.96E−05 | 1.87E−05 | −1.87E−06 | 2.38E−06 | 3.77E−07 | 2.06E−07 |
| J | −3.27E−04 | 5.23E−04 | −9.25E−06 | −3.44E−06 | 1.86E−07 | −1.74E−07 | −1.68E−08 | −1.03E−08 |

Figure 7:
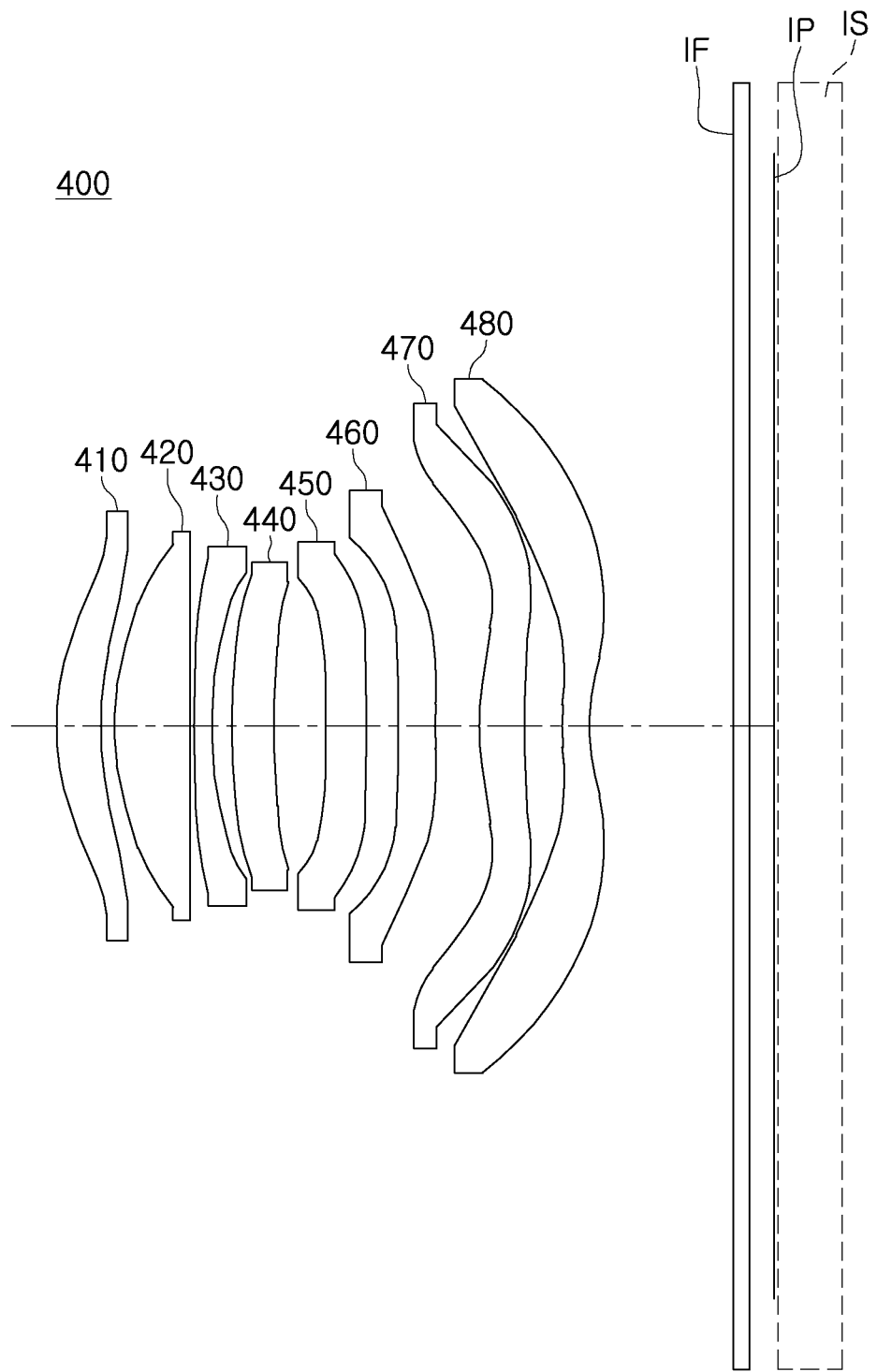
FIG. 7 illustrates a configuration diagram of an example imaging lens system, in accordance with a fourth embodiment.

An example imaging lens system according to a fourth example will be described with reference to FIG. 7.

An example imaging lens system 400 may include a first lens 410, a second lens 420, a third lens 430, a fourth lens 440, a fifth lens 450, a sixth lens 460, a seventh lens 470, and an eighth lens 480.

The first lens 410 may have positive refractive power, and may have a convex object-side surface and a concave image-side surface. The second lens 420 may have positive refractive power, and may have a convex object-side surface and a concave image-side surface. The third lens 430 may have negative refractive power, and may have a convex object-side surface and a concave image-side surface. The fourth lens 440 may have positive refractive power, and may have a convex object-side surface and a concave image-side surface. The fifth lens 450 may have negative refractive power, and may have a concave object-side surface and a concave image-side surface. The sixth lens 460 may have positive refractive power, and may have a convex object-side surface and a concave image-side surface. Additionally, an inflection point may be formed on an object-side surface and an image-side surface of the sixth lens 460. The seventh lens 470 may have positive refractive power, and may have a convex object-side surface and a convex image-side surface. Additionally, an inflection point may be formed on an object-side surface and an image-side surface of the seventh lens 470. The eighth lens 480 may have negative refractive power, and may have a convex object-side surface and a concave image-side surface. In addition, an inflection point may be formed on an object-side surface and an image-side surface of the eighth lens 480.

The example imaging lens system 400 may further include a filter IF and an imaging plane IP. The filter IF may be disposed between the eighth lens 480 and the imaging plane IP. The filter IF may be omitted as necessary. The imaging plane IP may be formed on one surface of an image sensor IS of a camera module or inside the image sensor IS.

Figure 8:
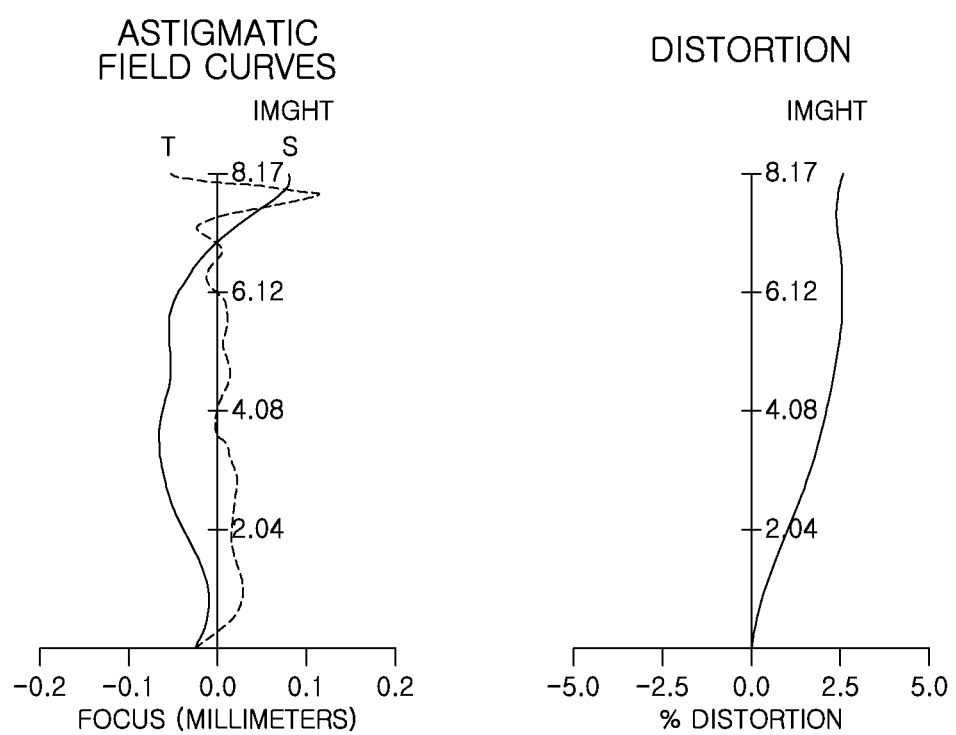
FIG. 8 illustrates an aberration curve of the example imaging lens system illustrated in FIG. 7.

Tables 7 and 8 illustrate lens characteristics and aspheric values of the example imaging lens system according to the present example. FIG. 8 illustrates an aberration curve of the example imaging lens system according to the present example.

TABLE 7

| Surface No. | Component | Curvature Radius | Thickness/ Distance | Refractive Index | Abbe No. |
|---|---|---|---|---|---|
| S1 | 1$^{st}$ Lens | 3.6568 | 0.6617 | 1.546 | 56.0 |
| S2 | | 4.5310 | 0.2113 | | |
| S3 | 2$^{nd}$ Lens | 4.2039 | 1.1261 | 1.546 | 56.0 |
| S4 | | 33.7120 | 0.0497 | | |
| S5 | 3$^{rd}$ Lens | 20.7377 | 0.2800 | 1.667 | 20.4 |
| S6 | | 6.3854 | 0.2927 | | |
| S7 | 4$^{th}$ Lens | 9.1798 | 0.6202 | 1.570 | 37.4 |
| S8 | | 12.2955 | 0.7664 | | |
| S9 | 5$^{th}$ Lens | −64.6212 | 0.6263 | 1.667 | 20.4 |
| S10 | | 38.3303 | 0.4703 | | |
| S11 | 6$^{th}$ Lens | 24.8395 | 0.5480 | 1.644 | 23.5 |
| S12 | | 27.3020 | 0.6530 | | |
| S13 | 7$^{th}$ Lens | 5.5793 | 0.6689 | 1.570 | 37.4 |
| S14 | | −2161.960 | 0.5540 | | |
| S15 | 8$^{th}$ Lens | 4.1787 | 0.4002 | 1.537 | 55.7 |
| S16 | | 2.0077 | 2.1584 | | |
| S17 | Filter | Infinity | 0.2100 | 1.518 | 64.2 |
| S18 | | Infinity | 0.3833 | | |
| S19 | Imaging Plane | Infinity | 0.0067 | | |

TABLE 8

| Surface No. | S1 | S2 | S3 | S4 | S5 | S6 | S7 | S8 |
|---|---|---|---|---|---|---|---|---|
| K | −4.10E+00 | −1.33E+01 | −4.59E+00 | −5.84E+01 | 3.28E+01 | 5.98E+00 | −1.46E+01 | 1.85E+01 |
| A | 7.32E−03 | 7.95E−03 | 4.71E−04 | −2.21E−03 | 1.11E−03 | −3.14E−03 | −5.00E−03 | −5.02E−03 |
| B | −1.46E−03 | −5.64E−03 | −1.08E−03 | −5.74E−03 | −5.73E−03 | −2.09E−03 | 2.91E−03 | −1.07E−03 |

TABLE 8-continued

| | | | | | | | | |
|---|---|---|---|---|---|---|---|---|
| C | 3.39E−04 | 1.84E−03 | 4.01E−04 | 4.27E−03 | 4.88E−03 | 3.98E−03 | −6.65E−03 | 5.88E−03 |
| D | −2.53E−04 | −3.04E−04 | −3.56E−05 | −5.37E−04 | −1.58E−03 | −5.25E−03 | 1.24E−02 | −1.21E−02 |
| E | 1.73E−04 | −1.28E−04 | 3.82E−05 | −1.26E−03 | −3.34E−04 | 4.95E−03 | −1.50E−02 | 1.64E−02 |
| F | −9.08E−05 | 1.35E−04 | −4.43E−05 | 1.19E−03 | 6.04E−04 | −3.36E−03 | 1.26E−02 | −1.51E−02 |
| G | 3.39E−05 | −5.99E−05 | 3.02E−05 | −6.00E−04 | −3.21E−04 | 1.64E−03 | −7.47E−03 | 9.83E−03 |
| H | −8.98E−06 | 1.67E−05 | −1.30E−05 | 2.01E−04 | 1.03E−04 | −5.74E−04 | 3.18E−03 | −4.57E−03 |
| J | 1.69E−06 | −3.15E−06 | 3.66E−06 | −4.75E−05 | −2.24E−05 | 1.43E−04 | −9.71E−04 | 1.52E−03 |

| Surface No. | S9 | S10 | S11 | S12 | S13 | S14 | S15 | S16 |
|---|---|---|---|---|---|---|---|---|
| K | 8.60E+01 | 9.64E+01 | 7.50E+01 | −9.65E+01 | −5.23E+00 | −3.58E+01 | −3.66E+01 | −8.10E+00 |
| A | −1.26E−02 | −1.44E−02 | −2.77E−02 | −3.56E−02 | 2.44E−03 | 1.40E−02 | −7.85E−02 | −5.05E−02 |
| B | 1.03E−03 | −5.76E−04 | 7.72E−03 | 8.57E−03 | −4.27E−03 | 4.57E−03 | 3.39E−02 | 1.98E−02 |
| C | −1.07E−03 | 6.66E−03 | −2.89E−03 | −3.67E−03 | 2.55E−04 | −7.42E−03 | −1.17E−02 | −6.30E−03 |
| D | −4.85E−04 | −1.14E−02 | 2.67E−03 | 3.18E−03 | −5.40E−06 | 3.45E−03 | 2.93E−03 | 1.50E−03 |
| E | 2.46E−03 | 1.14E−02 | −2.70E−03 | −2.18E−03 | 1.01E−04 | −9.60E−04 | −4.95E−04 | −2.63E−04 |
| F | −3.46E−03 | −7.87E−03 | 1.78E−03 | 1.01E−03 | −5.63E−05 | 1.81E−04 | 5.56E−05 | 3.37E−05 |
| G | 2.90E−03 | 3.87E−03 | −7.95E−04 | −3.20E−04 | 1.47E−05 | −2.44E−05 | −4.02E−06 | −3.17E−06 |
| H | −1.62E−03 | −1.37E−03 | 2.48E−04 | 7.19E−05 | −2.31E−06 | 2.40E−06 | 1.66E−07 | 2.20E−07 |
| J | 6.21E−04 | 3.52E−04 | −5.50E−05 | −1.14E−05 | 2.35E−07 | −1.71E−07 | −1.29E−09 | −1.13E−08 |

Figure 9:
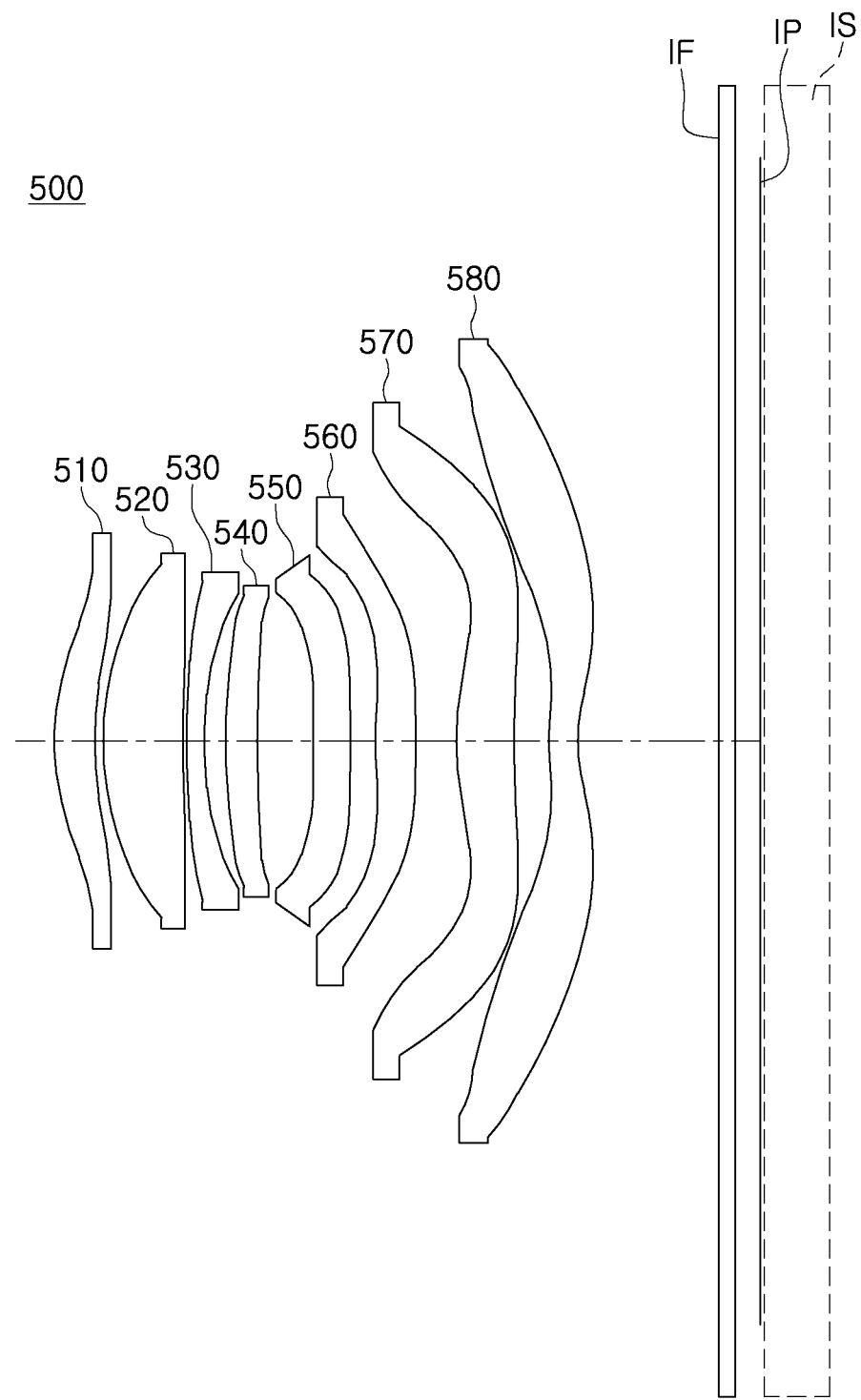
FIG. 9 illustrates a configuration diagram of an example imaging lens system, in accordance with a fifth embodiment.

An example imaging lens system according to a fifth example will be described with reference to FIG. 9.

An example imaging lens system 500 may include a first lens 510, a second lens 520, a third lens 530, a fourth lens 540, a fifth lens 550, a sixth lens 560, a seventh lens 570, and an eighth lens 580.

The first lens 510 may have positive refractive power, and may have a convex object-side surface and a concave image-side surface. The second lens 520 may have positive refractive power, and may have a convex object-side surface and a concave image-side surface. The third lens 530 may have negative refractive power, and may have a convex object-side surface and a concave image-side surface. The fourth lens 540 may have positive refractive power, and may have a convex object-side surface and a concave image-side surface. The fifth lens 550 may have negative refractive power, and may have a concave object-side surface and a concave image-side surface. The sixth lens 560 may have positive refractive power, and may have a convex object-side surface and a concave image-side surface. Additionally, an inflection point may be formed on an object-side surface and an image-side surface of the sixth lens 560. The seventh lens 570 may have positive refractive power, and may have a convex object-side surface and a convex image-side surface. Additionally, an inflection point may be formed on an object-side surface and an image-side surface of the seventh lens 570. The eighth lens 580 may have negative refractive power, and may have a convex object-side surface and a concave image-side surface. In addition, an inflection point may be formed on an object-side surface and an image-side surface of the eighth lens 580.

The example imaging lens system 500 may further include a filter IF and an imaging plane IP. The filter IF may be disposed between the eighth lens 580 and the imaging plane IP. The filter IF may be omitted as necessary. The imaging plane IP may be formed on one surface of an image sensor IS of a camera module or inside the image sensor IS.

Figure 10:
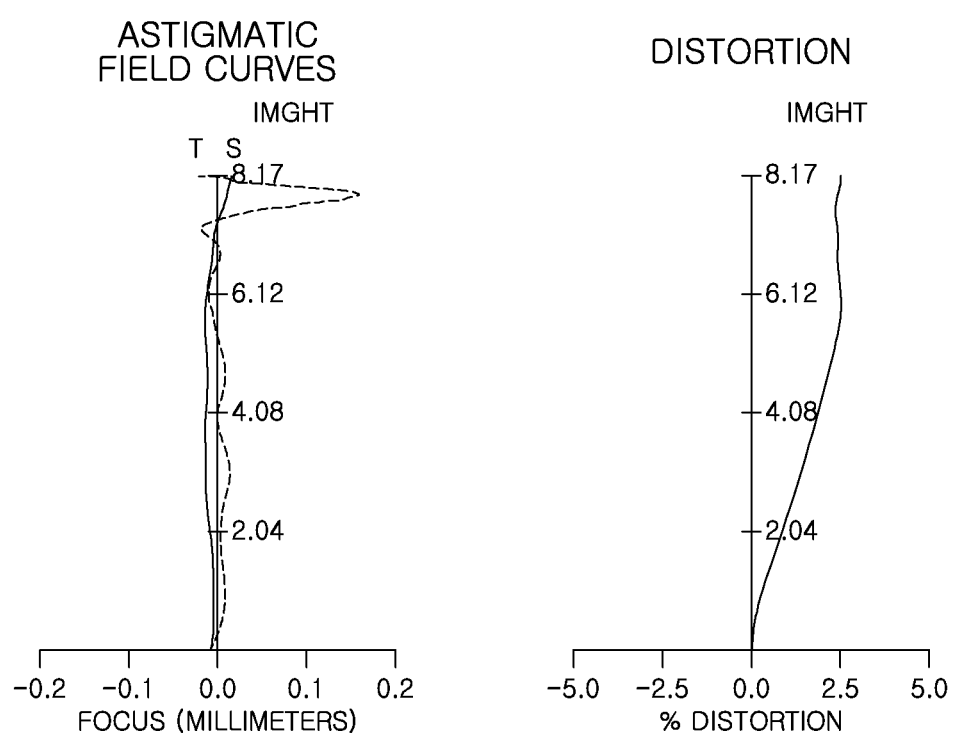
FIG. 10 illustrates an aberration curve of the example imaging lens system illustrated in FIG. 9.

Tables 9 and 10 illustrate lens characteristics and aspheric values of the imaging lens system according to the present example. FIG. 10 is an aberration curve of the example imaging lens system according to the present example.

TABLE 9

| Surface No. | Component | Curvature Radius | Thickness/ Distance | Refractive Index | Abbe No. |
|---|---|---|---|---|---|
| S1 | 1st Lens | 3.5434 | 0.5697 | 1.546 | 56.0 |
| S2 | | 4.1345 | 0.1409 | | |
| S3 | 2nd Lens | 3.8673 | 1.1644 | 1.537 | 55.7 |
| S4 | | 24.4374 | 0.0444 | | |
| S5 | 3rd Lens | 15.9498 | 0.2800 | 1.667 | 20.4 |
| S6 | | 6.0455 | 0.3002 | | |
| S7 | 4th Lens | 9.1066 | 0.4534 | 1.537 | 55.7 |
| S8 | | 15.6582 | 0.8365 | | |
| S9 | 5th Lens | −24.7402 | 0.5042 | 1.667 | 20.4 |
| S10 | | 37.8311 | 0.3987 | | |
| S11 | 6th Lens | 28.1962 | 0.5749 | 1.644 | 23.5 |
| S12 | | 35.1395 | 0.6018 | | |
| S13 | 7th Lens | 4.7571 | 0.8255 | 1.570 | 37.4 |
| S14 | | −225.2010 | 0.5120 | | |
| S15 | 8th Lens | 4.1019 | 0.4098 | 1.537 | 55.7 |
| S16 | | 1.8993 | 2.0819 | | |
| S17 | Filter | Infinity | 0.2100 | 1.518 | 64.2 |
| S18 | | Infinity | 0.3833 | | |
| S19 | Imaging Plane | Infinity | 0.0067 | | |

TABLE 10

| Surface No. | S1 | S2 | S3 | S4 | S5 | S6 | S7 | S8 |
|---|---|---|---|---|---|---|---|---|
| K | −5.89E+00 | −2.08E+01 | −4.66E+00 | −7.17E+01 | 2.82E+01 | 5.84E+00 | −1.42E+01 | 2.39E+01 |
| A | 1.13E−02 | 1.93E−02 | −1.61E−03 | 1.11E−03 | 1.97E−03 | −2.71E−03 | −4.83E−03 | −5.16E−03 |
| B | −3.45E−03 | −2.03E−02 | −1.11E−03 | −1.02E−02 | −9.62E−03 | −2.12E−03 | 2.89E−03 | −2.36E−03 |
| C | 8.21E−04 | 1.20E−02 | 5.05E−04 | 1.23E−02 | 1.30E−02 | 4.67E−03 | −8.01E−03 | 1.05E−02 |
| D | −4.78E−04 | −6.07E−03 | −5.26E−04 | −1.05E−02 | −1.21E−02 | −5.81E−03 | 1.62E−02 | −2.36E−02 |
| E | 3.15E−04 | 2.57E−03 | 1.23E−03 | 6.57E−03 | 7.89E−03 | 4.40E−03 | −2.15E−02 | 3.45E−02 |
| F | −1.76E−04 | −8.73E−04 | −1.28E−03 | −2.77E−03 | −3.38E−03 | −1.85E−03 | 1.96E−02 | −3.45E−02 |
| G | 6.98E−05 | 2.39E−04 | 7.99E−04 | 6.98E−04 | 7.98E−04 | 1.42E−04 | −1.26E−02 | 2.42E−02 |

TABLE 10-continued

| | | | | | | | |
|---|---|---|---|---|---|---|---|
| H | −1.91E−05 | −5.24E−05 | −3.28E−04 | −5.52E−05 | −4.03E−06 | 3.19E−04 | 5.84E−03 | −1.21E−02 |
| J | 3.69E−06 | 9.05E−06 | 9.17E−05 | −2.77E−05 | −6.75E−05 | −2.11E−04 | −1.95E−03 | 4.34E−03 |

| Surface No. | S9 | S10 | S11 | S12 | S13 | S14 | S15 | S16 |
|---|---|---|---|---|---|---|---|---|
| K | 3.86E+01 | −4.44E+00 | 9.57E+01 | 8.06E+01 | −7.12E+00 | 9.46E+01 | −3.65E+01 | −7.65E+00 |
| A | −1.64E−02 | −1.80E−02 | −3.06E−02 | −4.14E−02 | 6.82E−03 | 2.33E−02 | −7.66E−02 | −5.04E−02 |
| B | 3.95E−03 | −3.49E−03 | 7.77E−03 | 4.82E−03 | −1.28E−02 | −5.88E−03 | 2.85E−02 | 1.77E−02 |
| C | −1.55E−02 | 1.52E−02 | −3.61E−03 | 1.21E−03 | 5.68E−03 | −2.27E−03 | −8.66E−03 | −4.83E−03 |
| D | 3.58E−02 | −2.37E−02 | 7.16E−03 | 9.34E−04 | −2.00E−03 | 1.95E−03 | 2.07E−03 | 1.01E−03 |
| E | −5.33E−02 | 2.35E−02 | −8.64E−03 | −1.84E−03 | 5.96E−04 | −6.59E−04 | −3.50E−04 | −1.56E−04 |
| F | 5.32E−02 | −1.64E−02 | 6.07E−03 | 1.17E−03 | −1.43E−04 | 1.37E−04 | 4.11E−05 | 1.77E−05 |
| G | −3.70E−02 | 8.27E−03 | −2.80E−03 | −4.37E−04 | 2.53E−05 | −1.93E−05 | −3.37E−06 | −1.48E−06 |
| H | 1.83E−02 | −3.04E−03 | 8.92E−04 | 1.08E−04 | −3.18E−06 | 1.91E−06 | 1.96E−07 | 9.02E−08 |
| J | −6.50E−03 | 8.09E−04 | −2.01E−04 | −1.83E−05 | 2.78E−07 | −1.36E−07 | −8.14E−09 | −4.00E−09 |

Figure 11:
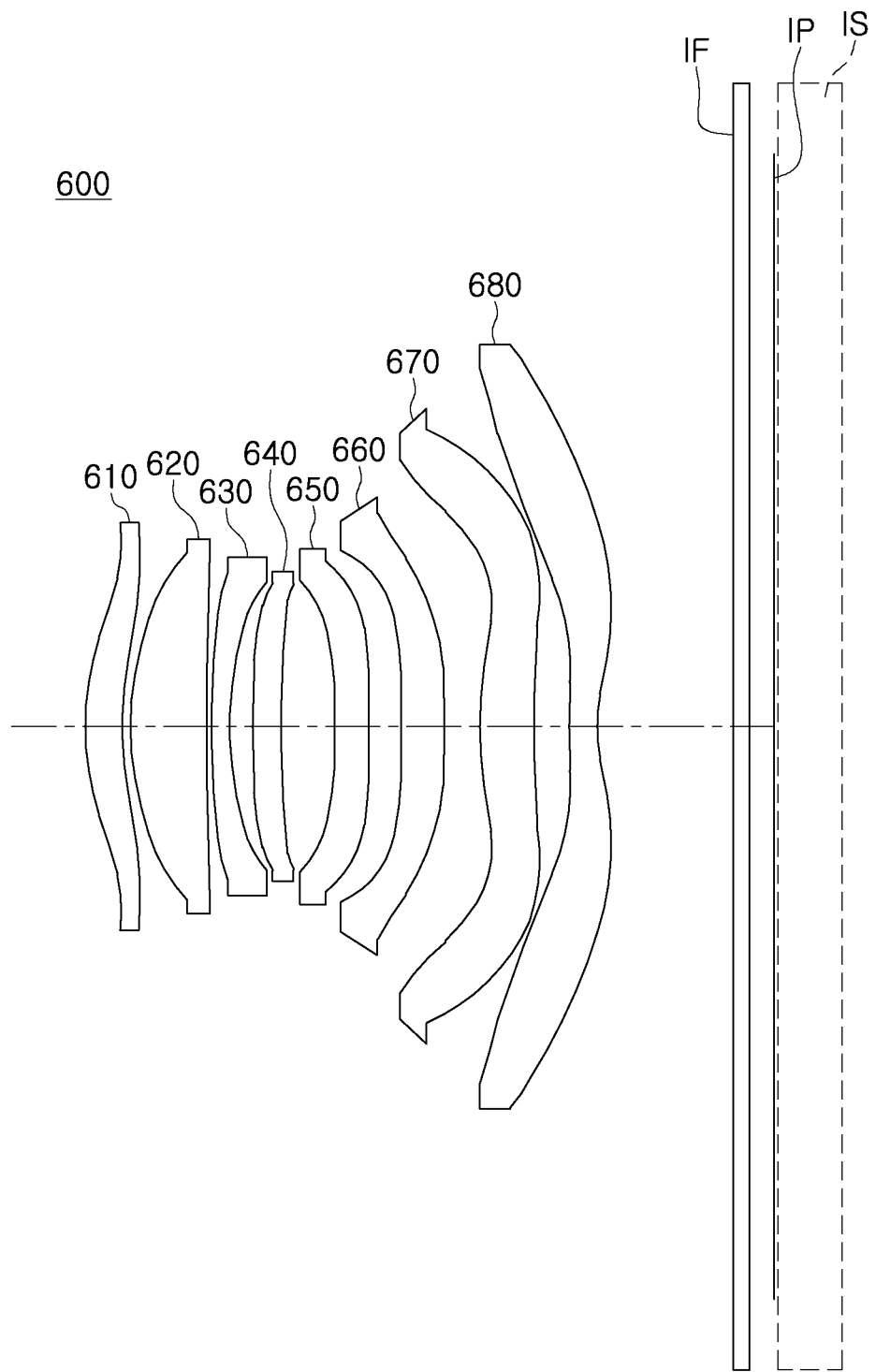
FIG. 11 illustrates a configuration diagram of an example imaging lens system, in accordance with a sixth embodiment.

An example imaging lens system according to a sixth example will be described with reference to FIG. 11.

An example imaging lens system 600 may include a first lens 610, a second lens 620, a third lens 630, a fourth lens 640, a fifth lens 650, a sixth lens 660, a seventh lens 670, and an eighth lens 680.

The first lens 610 may have positive refractive power, and may have a convex object-side surface and a concave image-side surface. The second lens 620 may have positive refractive power, and may have a convex object-side surface and a concave image-side surface. The third lens 630 may have negative refractive power, and may have a convex object-side surface and a concave image-side surface. The fourth lens 640 may have positive refractive power, and may have a convex object-side surface and a concave image-side surface. The fifth lens 650 may have negative refractive power, and may have a concave object-side surface and a concave image-side surface. The sixth lens 660 may have negative refractive power, and may have a convex object-side surface and a concave image-side surface. Additionally, an inflection point may be formed on an object-side surface and an image-side surface of the sixth lens 660. The seventh lens 670 may have positive refractive power, and may have a convex object-side surface and a concave image-side surface. Additionally, an inflection point may be formed on an object-side surface and an image-side surface of the seventh lens 670. The eighth lens 680 may have negative refractive power, and may have a convex object-side surface and a concave image-side surface. In addition, an inflection point may be formed on an object-side surface and an image-side surface of the eighth lens 680.

The example imaging lens system 600 may further include a filter IF and an imaging plane IP. The filter IF may be disposed between the eighth lens 680 and the imaging plane IP. The filter IF may be omitted as necessary. The imaging plane IP may be formed on one surface of an image sensor IS of a camera module or inside the image sensor IS.

Figure 12:
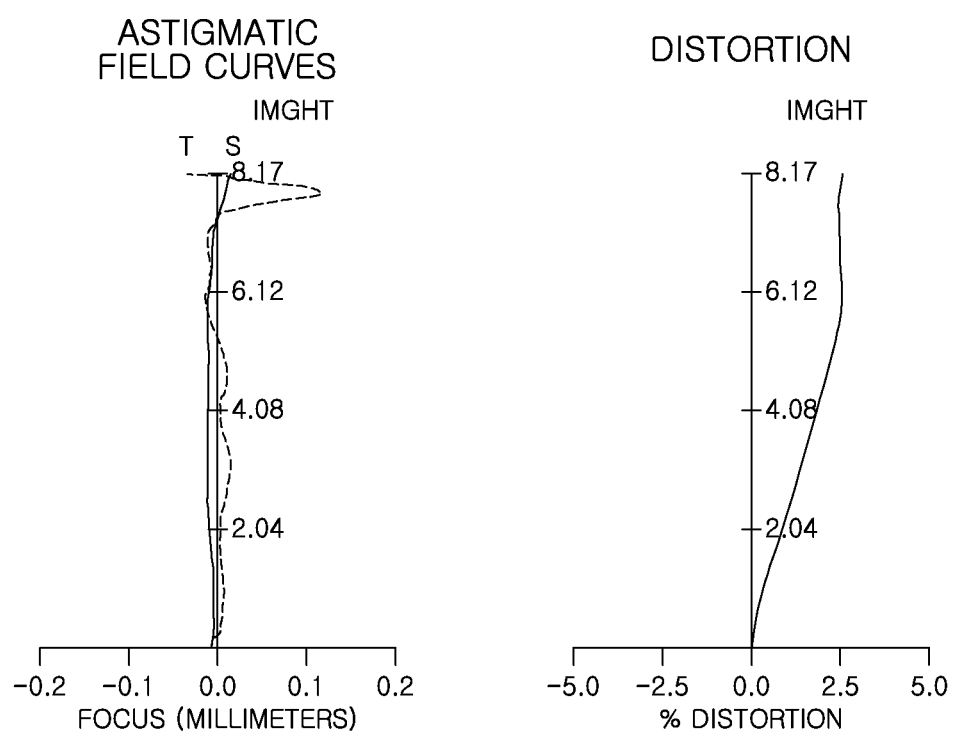
FIG. 12 illustrates an aberration curve of the example imaging lens system illustrated in FIG. 11.

Tables 11 and 12 illustrate lens characteristics and aspheric values of the example imaging lens system according to the present example. FIG. 12 is an aberration curve of the imaging lens system according to the present example.

TABLE 11

| Surface No. | Component | Curvature Radius | Thickness/ Distance | Refractive Index | Abbe No. |
|---|---|---|---|---|---|
| S1 | 1st Lens | 3.5389 | 0.5651 | 1.546 | 56.0 |
| S2 | | 3.9835 | 0.1213 | | |
| S3 | 2nd Lens | 3.7155 | 1.1672 | 1.537 | 55.7 |
| S4 | | 23.2749 | 0.0579 | | |
| S5 | 3rd Lens | 15.0299 | 0.2800 | 1.667 | 20.4 |
| S6 | | 5.9122 | 0.3158 | | |
| S7 | 4th Lens | 9.1491 | 0.4452 | 1.537 | 55.7 |
| S8 | | 16.6063 | 0.7885 | | |
| S9 | 5th Lens | −23.4248 | 0.5012 | 1.667 | 20.4 |
| S10 | | 131.6600 | 0.4855 | | |
| S11 | 6th Lens | 89.0644 | 0.6282 | 1.644 | 23.5 |
| S12 | | 33.3967 | 0.5268 | | |
| S13 | 7th Lens | 4.4961 | 0.8207 | 1.570 | 37.4 |
| S14 | | 121.5520 | 0.5280 | | |
| S15 | 8th Lens | 4.3420 | 0.4000 | 1.537 | 55.7 |
| S16 | | 1.9705 | 2.0537 | | |
| S17 | Filter | Infinity | 0.2100 | 1.518 | 64.2 |
| S18 | | Infinity | 0.3833 | | |
| S19 | Imaging Plane | Infinity | 0.0067 | | |

TABLE 12

| Surface No. | S1 | S2 | S3 | S4 | S5 | S6 | S7 | S8 |
|---|---|---|---|---|---|---|---|---|
| K | −5.93E+00 | −2.05E+01 | −4.79E+00 | −6.19E+01 | 2.87E+01 | 5.88E+00 | −1.17E+01 | 2.47E+01 |
| A | 1.13E−02 | 2.08E−02 | −2.07E−03 | −1.31E−03 | −1.19E−03 | −3.21E−03 | −4.78E−03 | −5.53E−03 |
| B | −3.48E−03 | −2.26E−02 | 1.71E−04 | −4.59E−03 | −3.92E−03 | −1.74E−03 | 5.05E−03 | 1.79E−03 |
| C | 9.41E−04 | 1.35E−02 | −2.83E−03 | 3.65E−03 | 4.64E−03 | 6.26E−03 | −1.54E−02 | −3.41E−03 |
| D | −6.43E−04 | −6.79E−03 | 4.30E−03 | −8.32E−04 | −2.55E−03 | −1.19E−02 | 3.03E−02 | 5.02E−03 |
| E | 4.42E−04 | 2.80E−03 | −3.37E−03 | −1.25E−03 | 2.57E−04 | 1.59E−02 | −3.92E−02 | −5.33E−03 |
| F | −2.43E−04 | −9.01E−04 | 1.78E−03 | 1.72E−03 | 8.49E−04 | −1.51E−02 | 3.50E−02 | 4.54E−03 |
| G | 9.43E−05 | 2.25E−04 | −6.51E−04 | −1.15E−03 | −7.99E−04 | 1.04E−02 | −2.22E−02 | −3.14E−03 |

TABLE 12-continued

| | | | | | | | |
|---|---|---|---|---|---|---|---|
| H | −2.54E−05 | −4.41E−05 | 1.67E−04 | 4.87E−04 | 3.94E−04 | −5.17E−03 | 1.01E−02 | 1.70E−03 |
| J | 4.84E−06 | 6.79E−06 | −2.99E−05 | −1.41E−04 | −1.25E−04 | 1.86E−03 | −3.32E−03 | −6.94E−04 |

| Surface No. | S9 | S10 | S11 | S12 | S13 | S14 | S15 | S16 |
|---|---|---|---|---|---|---|---|---|
| K | −1.33E+00 | 9.65E+01 | −9.62E+01 | 6.95E+01 | −7.96E+00 | −9.51E+01 | −3.78E+01 | −7.83E+00 |
| A | −1.66E−02 | −1.87E−02 | −2.98E−02 | −4.32E−02 | 6.31E−03 | 2.69E−02 | −7.40E−02 | −5.07E−02 |
| B | 2.09E−03 | −5.39E−04 | 1.14E−02 | 6.37E−03 | −1.42E−02 | −1.04E−02 | 2.67E−02 | 1.75E−02 |
| C | −2.08E−03 | 1.10E−02 | −9.63E−03 | 4.01E−04 | 5.96E−03 | −4.97E−04 | −8.15E−03 | −4.75E−03 |
| D | 4.07E−04 | −2.09E−02 | 1.31E−02 | 1.24E−03 | −1.69E−03 | 1.61E−03 | 2.00E−03 | 9.93E−04 |
| E | 1.91E−03 | 2.31E−02 | −1.31E−02 | −1.86E−03 | 3.68E−04 | −6.46E−04 | −3.47E−04 | −1.56E−04 |
| F | −3.54E−03 | −1.74E−02 | 8.55E−03 | 1.11E−03 | −6.67E−05 | 1.46E−04 | 4.19E−05 | 1.80E−05 |
| G | 3.39E−03 | 9.30E−03 | −3.84E−03 | −3.98E−04 | 9.32E−06 | −2.19E−05 | −3.55E−06 | −1.53E−06 |
| H | −2.07E−03 | −3.58E−03 | 1.22E−03 | 9.54E−05 | −8.77E−07 | 2.30E−06 | 2.15E−07 | 9.48E−08 |
| J | 8.53E−04 | 9.91E−04 | −2.77E−04 | −1.58E−05 | 4.54E−08 | −1.71E−07 | −9.34E−09 | −4.27E−09 |

Figure 13:
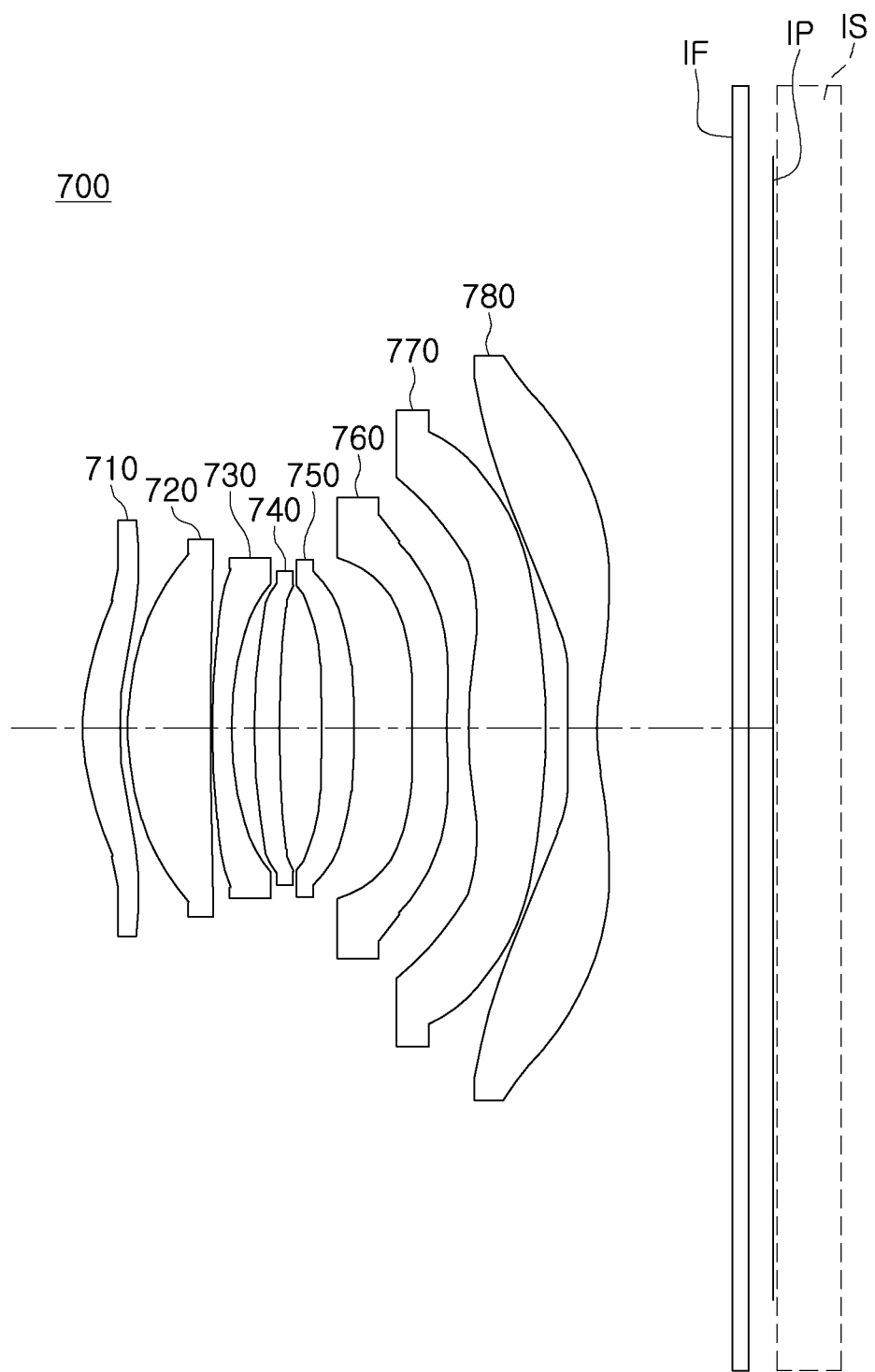
FIG. 13 illustrates a configuration diagram of an example imaging lens system, in accordance with a seventh embodiment.

An example imaging lens system according to a seventh example will be described with reference to FIG. 13.

An example imaging lens system 700 may include a first lens 710, a second lens 720, a third lens 730, a fourth lens 740, a fifth lens 750, a sixth lens 760, a seventh lens 770, and an eighth lens 780.

The first lens 710 may have positive refractive power, and may have a convex object-side surface and a concave image-side surface. The second lens 720 may have positive refractive power, and may have a convex object-side surface and a concave image-side surface. The third lens 730 may have negative refractive power, and may have a convex object-side surface and a concave image-side surface. The fourth lens 740 may have positive refractive power, and may have a convex object-side surface and a concave image-side surface. The fifth lens 750 may have positive refractive power, and may have a concave object-side surface and a convex image-side surface. The sixth lens 760 may have negative refractive power, and may have a concave object-side surface and a concave image-side surface. Additionally, an inflection point may be formed on an object-side surface and an image-side surface of the sixth lens 760. The seventh lens 770 may have positive refractive power, and may have a convex object-side surface and a convex image-side surface. Additionally, an inflection point may be formed on an object-side surface and an image-side surface of the seventh lens 770. The eighth lens 780 may have negative refractive power, and may have a convex object-side surface and a concave image-side surface. In addition, an inflection point may be formed on an object-side surface and an image-side surface of the eighth lens 780.

The imaging lens system 700 may further include a filter IF and an imaging plane IP. The filter IF may be disposed between the eighth lens 780 and the imaging plane IP. The filter IF may be omitted as necessary. The imaging plane IP may be formed on one surface of an image sensor IS of a camera module or inside the image sensor IS.

Figure 14:
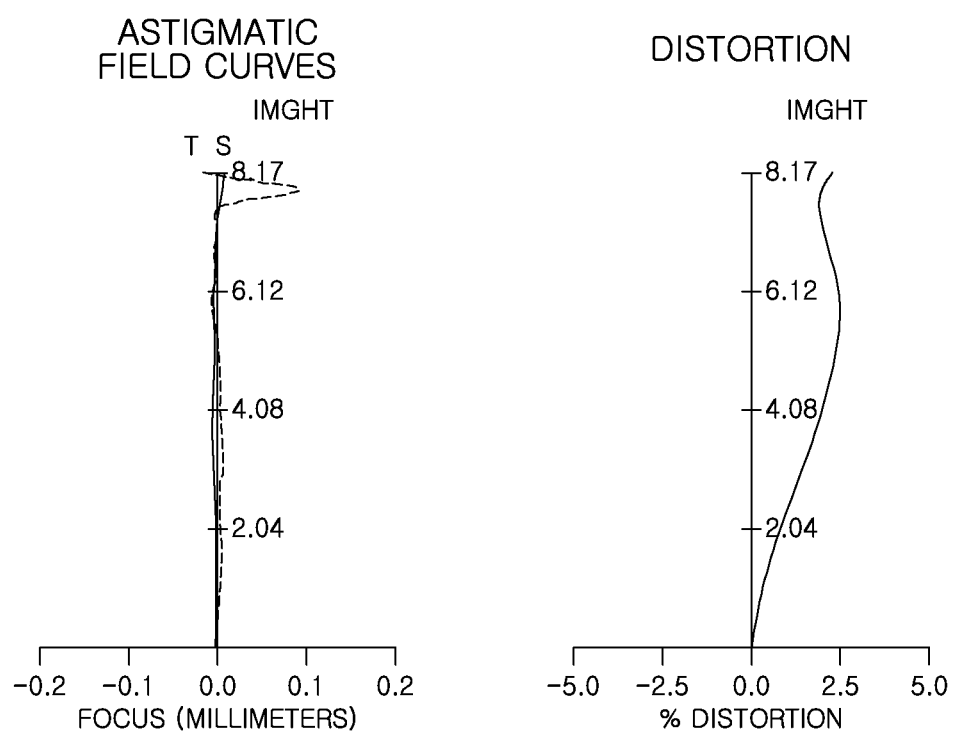
FIG. 14 illustrates an aberration curve of the example imaging lens system illustrated in FIG. 13.

Tables 13 and 14 illustrate lens characteristics and aspheric values of the example imaging lens system according to the present example. FIG. 14 is an aberration curve of the example imaging lens system according to the present example.

TABLE 13

| Surface No. | Component | Curvature Radius | Thickness/ Distance | Refractive Index | Abbe No. |
|---|---|---|---|---|---|
| S1 | 1st Lens | 3.5321 | 0.5486 | 1.546 | 56.0 |
| S2 | | 3.7134 | 0.0993 | | |
| S3 | 2nd Lens | 3.4669 | 1.2666 | 1.537 | 55.7 |
| S4 | | 25.9082 | 0.0250 | | |
| S5 | 3rd Lens | 15.9054 | 0.2800 | 1.667 | 20.4 |
| S6 | | 5.8625 | 0.3294 | | |
| S7 | 4th Lens | 7.6165 | 0.3804 | 1.537 | 55.7 |
| S8 | | 10.6634 | 0.6354 | | |
| S9 | 5th Lens | −24.8148 | 0.4827 | 1.667 | 20.4 |
| S10 | | −16.0466 | 0.8667 | | |
| S11 | 6th Lens | −22.2742 | 0.5136 | 1.644 | 23.5 |
| S12 | | 11.8548 | 0.3150 | | |
| S13 | 7th Lens | 5.4848 | 1.1545 | 1.570 | 37.4 |
| S14 | | −6.8951 | 0.3356 | | |
| S15 | 8th Lens | 5.6951 | 0.4000 | 1.537 | 55.7 |
| S16 | | 1.9072 | 2.0522 | | |
| S17 | Filter | Infinity | 0.2100 | 1.518 | 64.2 |
| S18 | | Infinity | 0.3804 | | |
| S19 | Imaging Plane | Infinity | 0.0096 | | |

TABLE 14

| Surface No. | S1 | S2 | S3 | S4 | S5 | S6 | S7 | S8 |
|---|---|---|---|---|---|---|---|---|
| K | −6.28E+00 | −1.94E+01 | −4.58E+00 | −5.20E+01 | 2.87E+01 | 5.72E+00 | −1.77E+01 | 2.18E−01 |
| A | 1.17E−02 | 2.26E−02 | −4.14E−03 | −4.28E−03 | −1.40E−03 | −2.68E−04 | −4.27E−03 | −8.14E−03 |
| B | −3.83E−03 | −2.57E−02 | 3.02E−03 | −1.07E−02 | −1.06E−02 | −4.05E−03 | 4.15E−03 | 2.80E−03 |
| C | 1.17E−03 | 1.62E−02 | −6.63E−03 | 1.89E−02 | 1.76E−02 | 9.60E−03 | −1.41E−02 | −9.00E−03 |
| D | −8.21E−04 | −8.37E−03 | 8.73E−03 | −1.58E−02 | −1.34E−02 | −1.66E−02 | 2.69E−02 | 1.83E−02 |
| E | 5.13E−04 | 3.46E−03 | −7.00E−03 | 7.78E−03 | 4.84E−03 | 2.13E−02 | −3.37E−02 | −2.52E−02 |
| F | −2.48E−04 | −1.09E−03 | 3.87E−03 | −1.99E−03 | 5.36E−04 | −2.00E−02 | 2.93E−02 | 2.44E−02 |
| G | 8.56E−05 | 2.54E−04 | −1.52E−03 | −9.07E−05 | −1.60E−03 | 1.36E−02 | −1.81E−02 | −1.70E−02 |

TABLE 14-continued

| | | | | | | | | |
|---|---|---|---|---|---|---|---|---|
| H | −2.05E−05 | −4.39E−05 | 4.27E−04 | 2.84E−04 | 9.27E−04 | −6.72E−03 | 8.10E−03 | 8.61E−03 |
| J | 3.42E−06 | 5.53E−06 | −8.62E−05 | −1.17E−04 | −3.11E−04 | 2.40E−03 | −2.61E−03 | −3.15E−03 |

| Surface No. | S9 | S10 | S11 | S12 | S13 | S14 | S15 | S16 |
|---|---|---|---|---|---|---|---|---|
| K | −9.65E+01 | −9.65E+01 | −4.44E+01 | −7.52E+01 | −6.99E+00 | −3.19E+01 | −9.65E+01 | −8.41E+00 |
| A | −1.08E−02 | −1.04E−02 | −2.13E−02 | −3.02E−02 | 4.72E−04 | 1.16E−02 | −9.08E−02 | −5.84E−02 |
| B | −1.33E−03 | −9.56E−03 | −5.78E−03 | −1.17E−02 | −2.11E−02 | −9.33E−03 | 2.95E−02 | 2.29E−02 |
| C | 4.48E−03 | 2.43E−02 | 1.94E−02 | 1.88E−02 | 1.46E−02 | 1.71E−03 | −6.15E−03 | −6.20E−03 |
| D | −1.38E−02 | −3.92E−02 | −2.54E−02 | −1.17E−02 | −5.95E−03 | 8.03E−04 | 9.54E−04 | 1.21E−03 |
| E | 2.35E−02 | 4.17E−02 | 2.36E−02 | 4.58E−03 | 1.64E−03 | −5.22E−04 | −1.03E−04 | −1.75E−04 |
| F | −2.57E−02 | −3.10E−02 | −1.64E−02 | −1.27E−03 | −3.25E−04 | 1.41E−04 | 6.40E−06 | 1.89E−05 |
| G | 1.93E−02 | 1.64E−02 | 8.45E−03 | 2.67E−04 | 4.66E−05 | −2.34E−05 | −8.97E−09 | −1.52E−06 |
| H | −1.01E−02 | −6.32E−03 | −3.15E−03 | −4.46E−05 | −4.74E−06 | 2.64E−06 | −3.74E−08 | 9.17E−08 |
| J | 3.77E−03 | 1.76E−03 | 8.47E−04 | 6.06E−06 | 3.32E−07 | −2.08E−07 | 3.65E−09 | −4.10E−09 |

Tables 15 and 16 illustrate optical characteristic values and conditional expression values of the example imaging lens systems according to the first to seventh examples.

TABLE 15

| | 1$^{st}$ Example | 2$^{nd}$ Example | 3$^{rd}$ Example | 4$^{th}$ Example | 5$^{th}$ Example | 6$^{th}$ Example | 7$^{th}$ Example |
|---|---|---|---|---|---|---|---|
| f1 | 65.8743 | 22.9285 | 28.3904 | 27.4041 | 33.8849 | 40.1006 | 64.0789 |
| f2 | 8.0564 | 9.7674 | 8.4878 | 8.6827 | 8.3961 | 8.0711 | 7.3149 |
| f3 | −17.1843 | −15.0945 | −13.5982 | −13.9512 | −14.7736 | −14.8039 | −14.0873 |
| f4 | 41.6320 | 35.4491 | 60.4611 | 59.2825 | 39.6036 | 37.1928 | 47.5993 |
| f5 | −28.4628 | −28.2064 | −36.6364 | −36.0094 | −22.3700 | −29.7979 | 66.6672 |
| f6 | 145.8869 | 317.7290 | 172.4647 | 393.3308 | 214.6103 | −83.3340 | −11.9430 |
| f7 | 12.0278 | 7.5139 | 10.0579 | 9.7658 | 8.1852 | 8.1715 | 5.5481 |
| f8 | −8.2712 | −5.7894 | −7.6941 | −7.6973 | −7.0495 | −7.1443 | −5.5484 |
| TTL | 11.1750 | 10.7850 | 10.6850 | 10.6871 | 10.2981 | 10.2850 | 10.2850 |
| BFL | 2.4836 | 2.8768 | 2.7682 | 2.7584 | 2.6819 | 2.6537 | 2.6522 |
| BFLx | 2.4836 | 2.8768 | 2.7682 | 2.7584 | 2.6819 | 2.6537 | 2.6522 |
| BFLm | 0.6000 | 0.6000 | 0.6000 | 0.6000 | 0.6000 | 0.6000 | 0.6000 |
| f | 9.9600 | 9.8305 | 9.7959 | 9.7642 | 9.2833 | 9.3340 | 9.4014 |
| f number | 1.8242 | 1.7999 | 1.7717 | 1.7718 | 1.8130 | 1.7941 | 1.7894 |
| ImgHT | 8.1660 | 8.1660 | 8.1660 | 8.1660 | 8.5160 | 8.5160 | 8.5160 |
| HFOV | 77.0246 | 77.6735 | 78.1896 | 78.3402 | 81.2225 | 80.9177 | 80.6277 |

TABLE 16

| Conditional Expression | 1$^{st}$ Example | 2$^{nd}$ Example | 3$^{rd}$ Example | 4$^{th}$ Example | 5$^{th}$ Example | 6$^{th}$ Example | 7$^{th}$ Example |
|---|---|---|---|---|---|---|---|
| BFL/TTL | 0.2222 | 0.2667 | 0.2591 | 0.2581 | 0.2604 | 0.2580 | 0.2579 |
| BFL/f2 | 0.3083 | 0.2945 | 0.3261 | 0.3177 | 0.3194 | 0.3288 | 0.3626 |
| V1-V2 | 0.0000 | 0.0000 | 0.0000 | 0.0000 | 0.2547 | 0.2547 | 0.2547 |
| V1-V3 | 35.6132 | 34.4538 | 35.6132 | 35.6132 | 35.6132 | 35.6132 | 35.6132 |
| V1-V4 | 0.0000 | 0.0000 | 18.5873 | 18.5873 | 0.2547 | 0.2547 | 0.2547 |
| V1-V5 | 36.7521 | 36.7521 | 35.6132 | 35.6132 | 35.6132 | 35.6132 | 35.6132 |
| f1/f | 6.6139 | 2.3324 | 2.8982 | 2.8066 | 3.6501 | 4.2962 | 6.8159 |
| f2/f | 0.8089 | 0.9936 | 0.8665 | 0.8892 | 0.9044 | 0.8647 | 0.7781 |
| f3/f | −1.7253 | −1.5355 | −1.3881 | −1.4288 | −1.5914 | −1.5860 | −1.4984 |
| f4/f | 4.1799 | 3.6060 | 6.1721 | 6.0714 | 4.2661 | 3.9847 | 5.0630 |
| f5/f | −2.8577 | −2.8693 | −3.7400 | −3.6879 | −2.4097 | −3.1924 | 7.0912 |
| f6/f | 14.6472 | 32.3208 | 17.6058 | 40.2830 | 23.1179 | −8.9280 | −1.2703 |
| f7/f | 1.2076 | 0.7643 | 1.0267 | 1.0002 | 0.8817 | 0.8755 | 0.5901 |
| f8/f | −0.8304 | −0.5889 | −0.7854 | −0.7883 | −0.7594 | −0.7654 | −0.5902 |
| TTL/f | 1.1220 | 1.0971 | 1.0908 | 1.0945 | 1.1093 | 1.1019 | 1.0940 |
| f1/f2 | 8.1767 | 2.3475 | 3.3448 | 3.1562 | 4.0358 | 4.9684 | 8.7601 |
| f2/f3 | −0.4688 | −0.6471 | −0.6242 | −0.6224 | −0.5683 | −0.5452 | −0.5193 |
| BFL/f | 0.2494 | 0.2926 | 0.2826 | 0.2825 | 0.2889 | 0.2843 | 0.2821 |
| D12/f | 0.0188 | 0.0186 | 0.0162 | 0.0216 | 0.0152 | 0.0130 | 0.0106 |
| TTL/2ImgHT | 0.6842 | 0.6604 | 0.6542 | 0.6544 | 0.6046 | 0.6039 | 0.6039 |
| (TTL-BFL)/2ImgHT | 0.5322 | 0.4842 | 0.4847 | 0.4855 | 0.4472 | 0.4481 | 0.4481 |
| BFL/f1 | 0.03770 | 0.12547 | 0.09751 | 0.10066 | 0.07915 | 0.06618 | 0.04139 |
| BFL/f2 | 0.30828 | 0.29453 | 0.32614 | 0.31769 | 0.31942 | 0.32879 | 0.36257 |
| BFL/f3 | −0.14453 | −0.19059 | −0.20358 | −0.19771 | −0.18153 | −0.17926 | −0.18827 |

TABLE 16-continued

| Conditional Expression | 1st Example | 2nd Example | 3rd Example | 4th Example | 5th Example | 6th Example | 7th Example |
|---|---|---|---|---|---|---|---|
| T1/ImgHT | 0.06063 | 0.06836 | 0.08504 | 0.08103 | 0.06689 | 0.06636 | 0.06442 |
| EPD/ImgHT | 0.66864 | 0.66884 | 0.67710 | 0.67487 | 0.60126 | 0.61091 | 0.61694 |
| SumT/BFL | 2.16151 | 1.76587 | 1.77221 | 1.78774 | 1.78300 | 1.81166 | 1.89520 |

Hereinafter, an example of an example imaging lens system that reduces a thickness of a camera module will be described with reference to FIGS. 15 to 19.

Figure 15:
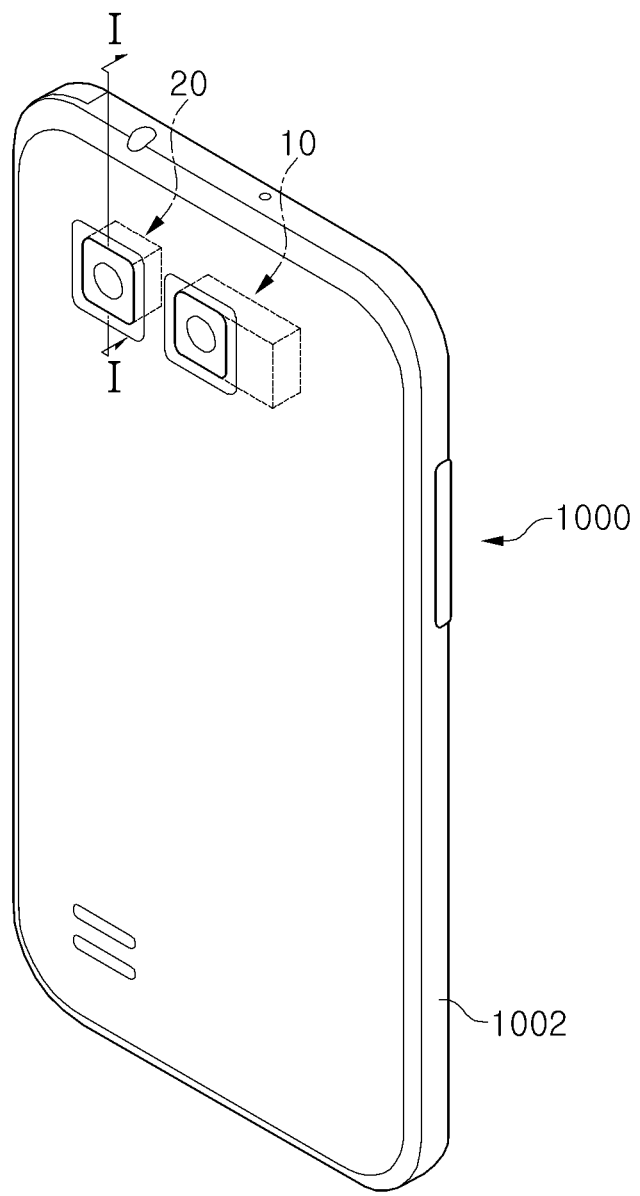
FIG. 15 illustrates a perspective view of an example portable terminal on which a camera module is mounted, in accordance with one or more embodiments.

An example camera module 20, in accordance with one or more embodiments, may be mounted on a portable terminal 1000, as illustrated in FIG. 15. Specifically, in a non-limited example, the example camera module 20 may be mounted on one surface of the portable terminal 1000, together with another type of camera module 10. A target or a base on which the example camera module 20 may be mounted is not limited to the portable terminal.

An example camera module 20, in accordance with one or more embodiments, may be configured to implement a predetermined angle of view. In an example, an angle of view of the example camera module 20 may be greater than an angle of view of the camera modules 10. Specifically, an example camera module 20, in accordance with one or more embodiments may be configured to capture an image of a subject located at a short distance while having a higher resolution, compared to the example camera module 10.

Figure 16:
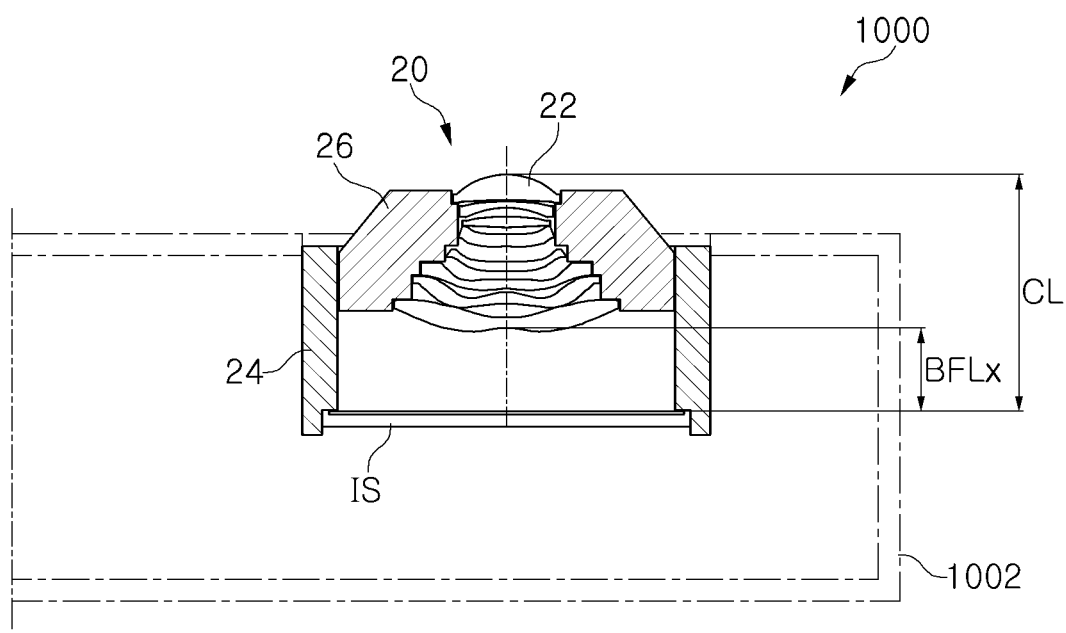
FIG. 16 illustrates a cross-sectional view of an example portable terminal.
Figure 17:
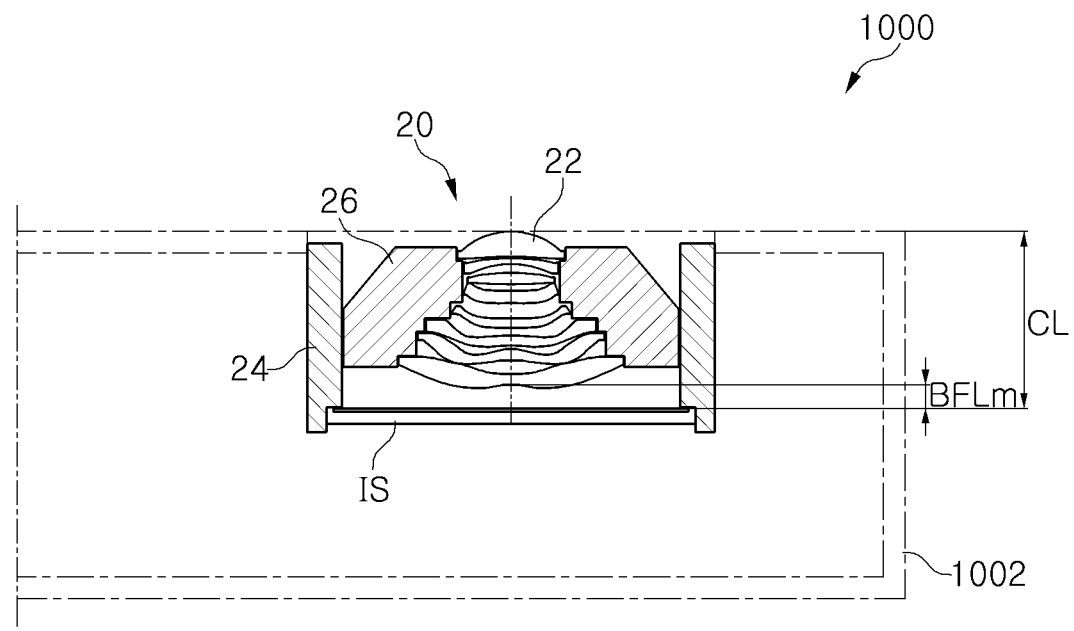
FIG. 17 illustrates a cross-sectional view of an example portable terminal.

Referring to FIG. 16, example camera module 20 may include a first barrel 24, a second barrel 26, and an image sensor IS. A configuration of the example camera module 20 is not limited to the above-described components. In an example, the camera module 20 may further include a driver that drives the first barrel 24. The example camera module 20 may include an imaging lens system 22. In an example, the example camera module 20 may include an imaging lens system, for example, one of the imaging lens systems according to the first to seventh examples described above.

The example camera module 20 may be configured such that a length CL in an optical axis direction is variable. In an example, the length of the example camera module 20 in the optical axis direction may decrease from a state illustrated in FIG. 16 to a state illustrated in FIG. 17. The length of the camera module 20 in the optical axis direction may increase from a state illustrated in FIG. 17 to a state illustrated in FIG. 16. The variable length of the camera module 20 in the optical axis direction may be generally proportional to a distance from a rearmost lens to the image sensor IS. Specifically, a difference BFLx-BFLm between a distance BFLx from the rearmost lens to the image sensor IS in an operating state (or an imaging state) of the example camera module 20 and a distance BFLm from the rearmost lens to the image sensor IS in a non-operational state of the example camera module 20 may have the following numerical relationship, with respect to a rear focal length of the imaging lens system 22 or the distance BFLx from the rearmost lens to the image sensor IS in the operating state (or the imaging state) of the camera module 20:

$$0.6 < (BFLx - BFLm)/BFLx < 0.8$$

The example camera module 20 may include an imaging lens system 22. In a non-limiting example, the example camera module 20 may include an imaging lens system 22 consisting of eight (8) lenses. A configuration of the imaging lens system 22 is not limited to the eight (8) lenses. For example, the imaging lens system 22 may be configured with six (6) or seven (7) lenses, or nine (9) or more lenses.

Figure 18:
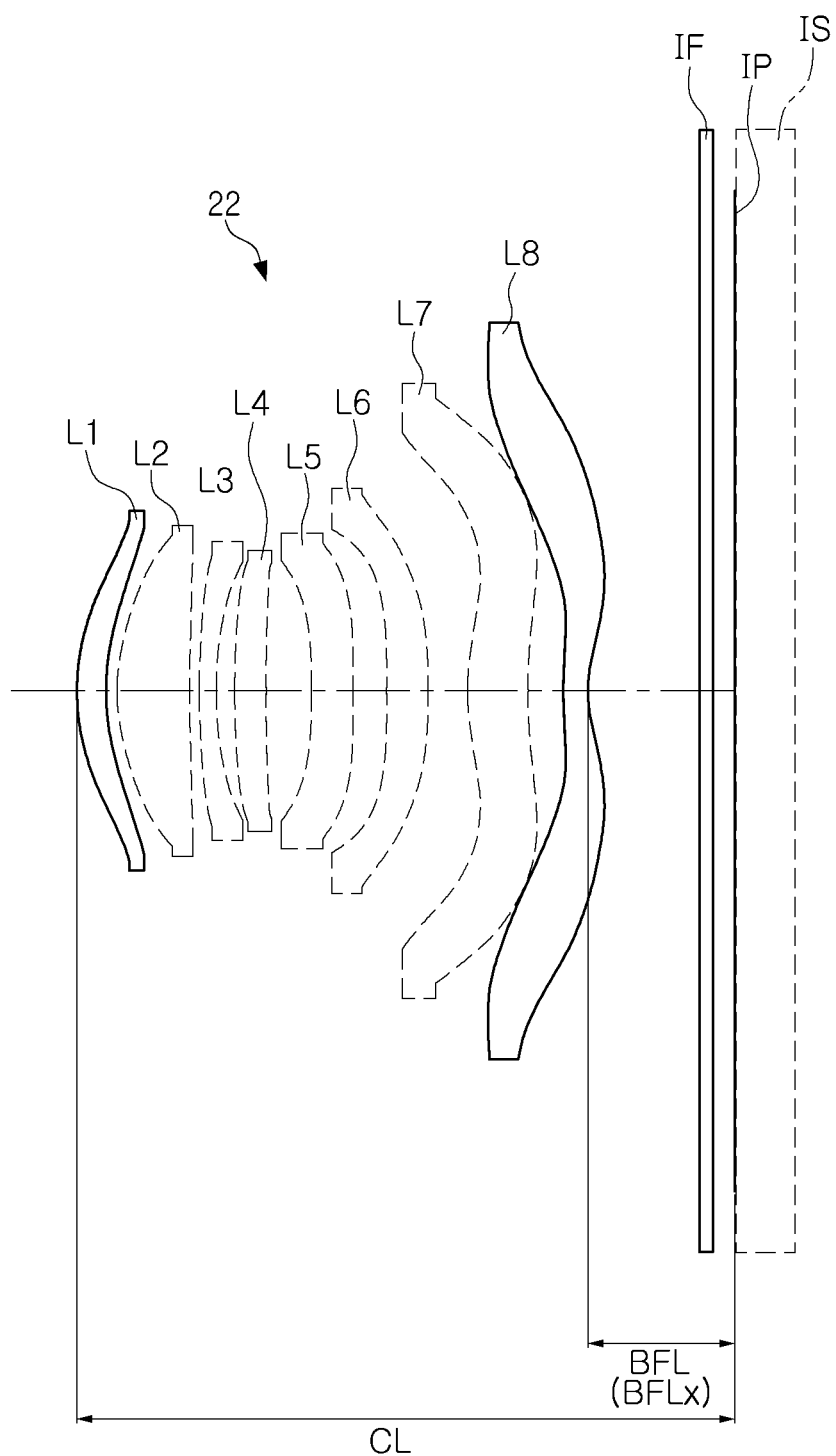
FIG. 18 illustrates an enlarged view of an example imaging lens system, in accordance with one or more embodiments.
Figure 19:
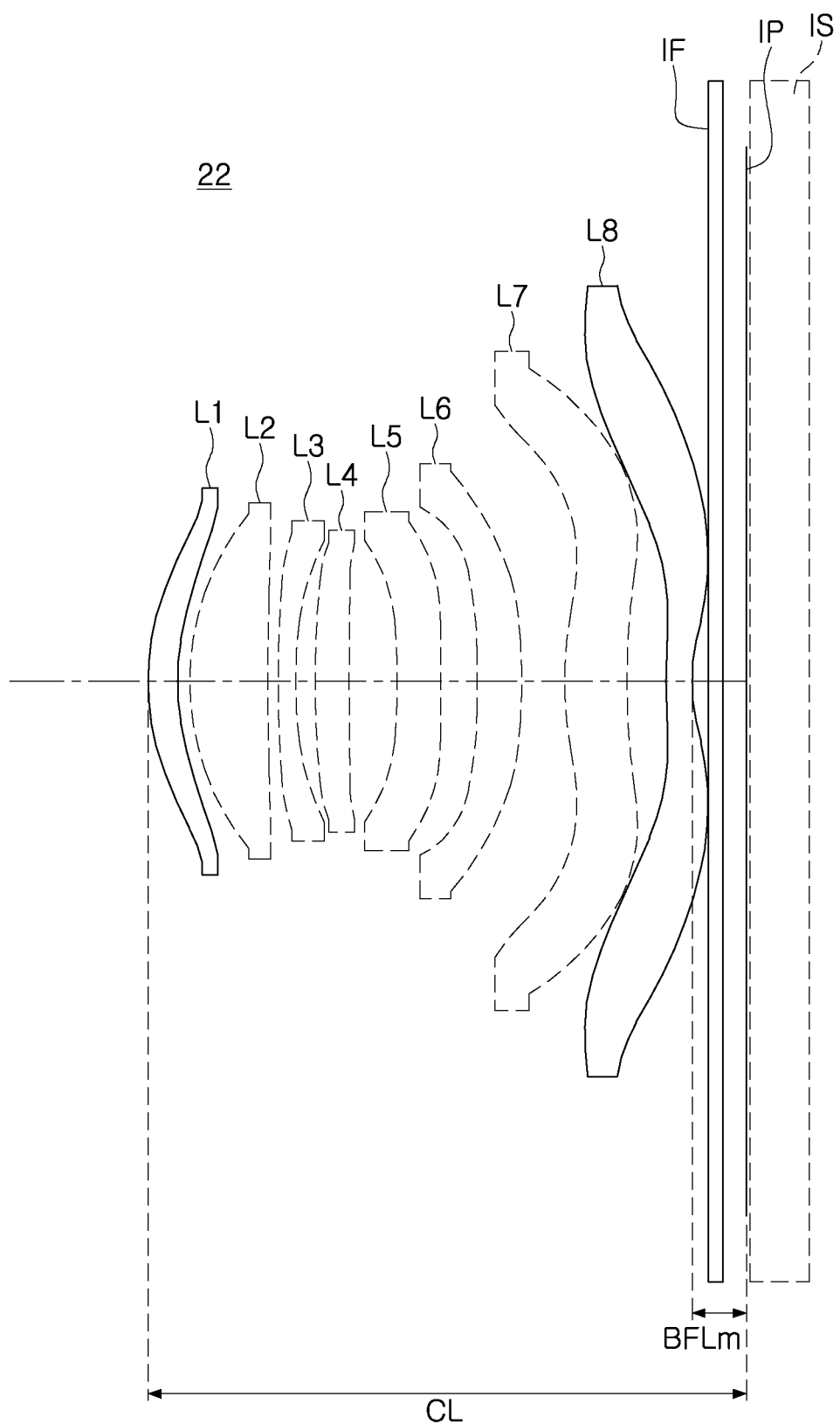
FIG. 19 illustrates an enlarged view of an example imaging lens system, in accordance with one or more embodiments.

As illustrated in FIGS. 18 and 19, an example imaging lens system 22 may include a first lens L1, a second lens L2, a third lens L3, a fourth lens L4, a fifth lens L5, a sixth lens L6, a seventh lens L7, and an eighth lens L8. A configuration of the example imaging lens system 22 is not limited to the eight (8) lenses. For example, the imaging lens system 22 may be configured by eight (8) lenses or less or nine (9) lenses or more. As a specific example, the imaging lens system 22 may include six (6) lenses. Additionally, the imaging lens system 22 may further include a filter IF, as necessary.

The first lens L1 to the eighth lens L8 may be sequentially disposed in an optical axis direction. For example, the second lens L2 may be disposed on an image-side of the first lens L1, and the third lens L3 may be disposed on an image-side of the second lens L2. Therefore, in an imaging lens system 22 according to the present embodiment, no optical element, other than a filter IF or an image sensor IS, may be disposed on an image-side of the eighth lens L8, which may be the rearmost lens. The first lens L1 to the eighth lens L8 may be configured to form an image of incident light at a predetermined position. For example, light refracted by the first lens L1 to the eighth lens L8 may form an image on an imaging plane IP formed in the image sensor IS.

The imaging lens system 22 may be configured to have sufficient space to be moved in the optical axis direction. Specifically, the imaging lens system 22 may be configured to have a substantial rear focal length (e.g., a distance from the image-side of the eighth lens L8 to the imaging plane IP: BFL). For example, the BFL of the imaging lens system 22 may be greater than 1.9 mm and less than 2.8 mm. The BFL of the imaging lens system 22 may increase or decrease in proportion to a length of the imaging lens system 22. For example, a ratio (BFL/TTL) between the BFL of the imaging lens system 22 and the length of the imaging lens system 22 (TTL: a distance from an object-side surface of the first lens L1 to the imaging plane IP) may be greater than 0.15.

The BFL of the example imaging lens system 22 may be utilized as a space to avoid the first lens L1 to the eighth lens L8 in an imaging plane IP direction. For example, the first lens L1 to the eighth lens L8 may move in the imaging plane IP direction by a distance corresponding to the BFL. In an example, the BFL of the imaging lens system 22 may be substantially the same size as the BFLx of a camera module 20. The BFL and the BFLx may not be necessarily formed to have the same size. For example, when the imaging plane IP is formed in the image sensor IS, BFL may be greater than BFLx.

The example imaging lens system 22 may be configured to realize high resolution. In an example, the imaging lens system 22 may be configured to form an imaging plane IP having a relatively large size. For example, a height of the imaging plane IP may be 5.0 mm to 9.0 mm.

A change in length of the example camera module 20 may be performed by a plurality of barrels 24 and 26. In an example, the length CL of the camera module 20 may be varied by driving a second barrel 26 accommodated in a first barrel 24 in the optical axis direction.

The first barrel 24 may be configured to receive the second barrel 26 and an image sensor IS. Additionally, the first barrel 24 may further accommodate a driver to drive the second barrel 26. A configuration accommodated in the first barrel 24 is not limited to the second barrel 26, the image sensor IS, and the driving means.

The second barrel 26 may be disposed on the first barrel 24, and may be configured to receive the imaging lens system 22. The second barrel 26 may be configured to move in the optical axis direction. For example, the second barrel 26 may move toward an object-side or toward the image sensor IS while accommodating the imaging lens system 22. The second barrel 26 may be partially unloaded from the first barrel 24, or may be completely loaded into an internal space of the first barrel 24, depending on a moving direction thereof. For example, the second barrel 26 may be unloaded outside the first barrel 24 as it moves toward the object-side, and may be loaded into the internal space of the first barrel 24 as it moves toward the image sensor IS.

The driver (not illustrated) may be configured to move the second barrel 26 in the optical axis direction. For example, the driver may move the second barrel 26 in the optical axis direction by a driving magnet and a driving coil. A configuration of the driver is not limited to the driving magnet and the driving coil.

The example camera module 20, configured as above, may implement high-resolution imaging. For example, the camera module 20 may enable the use of a large image sensor IS by forming a sufficient distance and space between an imaging lens system 22 and an image sensor IS. Additionally, the example camera module 20 may be configured to facilitate thinning. For example, the example camera module 20 may reduce a size of the example camera module 20 by varying a length CL in the optical axis direction as described above. Therefore, the example camera module 20 according to the present embodiment may be easily mounted on a small and thin electronic device.

In a non-limiting example, the example imaging lens system, in accordance with one or more embodiments, may be mounted on a thin portable electronic device.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:
a first lens having a refractive power;
a second lens having positive refractive power, and having a concave image-side surface;
a third lens having a refractive power;
a fourth lens having positive refractive power, and having a concave image-side surface;
a fifth lens having a concave object-side surface;
a sixth lens having a concave image-side surface;
a seventh lens having a convex object-side surface; and
an eighth lens having a refractive power,
wherein the first to eighth lenses are sequentially arranged from an object-side to an imaging side, and
the imaging lens system satisfies the following conditional expression:

$$0.15 < BFL/TTL,$$

where BFL is a distance from an image-side surface of the eighth lens to an imaging plane, and TTL is a distance from an object-side surface of the first lens to the imaging plane.

2. The imaging lens system of claim 1, wherein the first lens has a convex object-side surface.

3. The imaging lens system of claim 1, wherein the third lens has a convex object-side surface.

4. The imaging lens system of claim 1, wherein the eighth lens has a convex object-side surface.

5. The imaging lens system of claim 1, which satisfies the following conditional expression:

$$0 < f1/f < 8.0,$$

where f is a focal length of the imaging lens system, and f1 is a focal length of the first lens.

6. The imaging lens system of claim 1, which satisfies the following conditional expression:

$$0 < f2/f < 3.0,$$

where f is a focal length of the imaging lens system, and f2 is a focal length of the second lens.

7. The imaging lens system of claim 1, which satisfies the following conditional expression:

$$TTL/f < 1.5,$$

where f is a focal length of the imaging lens system.

8. The imaging lens system of claim 1, which satisfies the following conditional expression:

$$BFL/f < 0.4,$$

where f is a focal length of the imaging lens system.

9. The imaging lens system of claim 1, which satisfies the following conditional expression:

$$TTL/2ImgHT < 0.8,$$

where 2ImgHT is a diagonal length of the imaging plane.

10. An imaging lens system, comprising:
a first lens having positive refractive power;
a second lens having positive refractive power;
a third lens having a refractive power;
a fourth lens having a refractive power;
a fifth lens having a concave object-side surface;
a sixth lens having a refractive power;
a seventh lens having positive refractive power; and
an eighth lens having a refractive power, and a convex object-side surface in a paraxial region,
wherein the first to eighth lenses are sequentially arranged from an object-side to an imaging side, and the imaging lens system satisfies the following conditional expression:

$0.2 < BFL/TTL < 0.35$, where BFL is a distance from an image-side surface of the eighth lens to an imaging plane, and TTL is a distance from an object-side surface of the first lens to the imaging plane.

11. The imaging lens system of claim 10, wherein the third lens has negative refractive power.

12. The imaging lens system of claim 10, wherein the eighth lens has negative refractive power.

13. The imaging lens system of claim 10, which satisfies the following conditional expression:

$0.02 < BFL/f1 < 0.16$, where f1 is a focal length of the first lens.

14. The imaging lens system of claim 10, which satisfies the following conditional expression:

$0.2 < BFL/f2 < 0.4$, where f2 is a focal length of the second lens.

15. The imaging lens system of claim 10, which satisfies the following conditional expression:

$-0.3 < BFL/f3 < -0.1$, where f3 is a focal length of the third lens.

16. The imaging lens system of claim 10, which satisfies the following conditional expression:

$0.06 < T1/\text{ImgHT} < 0.10$,

Where T1 is a thickness of the first lens, and ImgHT is a height of the imaging plane.

17. An electronic device, comprising the imaging lens system of claim 10.

* * * * *